(12) United States Patent
Kagawa et al.

(10) Patent No.: US 9,732,254 B2
(45) Date of Patent: Aug. 15, 2017

(54) MULTI-LAYERED FILM AND THE USE THEREOF

(71) Applicant: BASF SE, Ludwigshafen (DE)

(72) Inventors: Tadashi Kagawa, Minato-ku (JP); Hiroshi Baba, Minato-ku (JP)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 15/307,294

(22) PCT Filed: Apr. 28, 2015

(86) PCT No.: PCT/EP2015/059140
§ 371 (c)(1),
(2) Date: Oct. 27, 2016

(87) PCT Pub. No.: WO2015/165871
PCT Pub. Date: Nov. 5, 2015

(65) Prior Publication Data
US 2017/0058151 A1    Mar. 2, 2017

(30) Foreign Application Priority Data
Apr. 29, 2014  (EP) .................... 14166340

(51) Int. Cl.
| | | |
|---|---|---|
| *C09J 7/02* | (2006.01) | |
| *B32B 37/12* | (2006.01) | |
| *B32B 27/40* | (2006.01) | |
| *B32B 27/20* | (2006.01) | |
| *B32B 27/08* | (2006.01) | |
| *B32B 27/30* | (2006.01) | |
| *C08K 5/3435* | (2006.01) | |
| *C08K 5/3492* | (2006.01) | |

(52) U.S. Cl.
CPC ............. *C09J 7/0296* (2013.01); *B32B 27/08* (2013.01); *B32B 27/20* (2013.01); *B32B 27/304* (2013.01); *B32B 27/308* (2013.01); *B32B 27/40* (2013.01); *B32B 37/12* (2013.01); *B32B 2255/10* (2013.01); *B32B 2255/26* (2013.01); *B32B 2405/00* (2013.01); *B32B 2605/00* (2013.01); *C08K 5/3435* (2013.01); *C08K 5/3492* (2013.01); *C09J 2423/001* (2013.01); *C09J 2433/003* (2013.01); *C09J 2475/00* (2013.01); *C09J 2475/006* (2013.01)

(58) Field of Classification Search
CPC ........ C09J 7/0296; B32B 27/08; B32B 27/20; B32B 27/40; B32B 37/12
See application file for complete search history.

(56) References Cited

U.S. PATENT DOCUMENTS

| | | | |
|---|---|---|---|
| 4,325,863 A | 4/1982 | Hinsken et al. | |
| 4,338,244 A | 7/1982 | Hinsken et al. | |
| 5,175,312 A | 12/1992 | Dubs et al. | |
| 5,216,052 A | 6/1993 | Nesvadba et al. | |
| 5,252,643 A | 10/1993 | Nesvadba | |
| 2001/0051256 A1 | 12/2001 | Silagy et al. | |
| 2013/0112272 A1* | 5/2013 | Ackermann | B32B 27/08 |
| | | | 136/259 |
| 2013/0236719 A1 | 9/2013 | Ohwada et al. | |

FOREIGN PATENT DOCUMENTS

| | | |
|---|---|---|
| DE | 43 16 611 A1 | 11/1993 |
| DE | 43 16 622 A1 | 11/1993 |
| DE | 43 16 876 A1 | 11/1993 |
| EP | 0 589 839 A1 | 3/1994 |
| EP | 0 591 102 A1 | 4/1994 |
| EP | 1 291 384 A1 | 3/2003 |
| EP | 1 302 309 A2 | 4/2003 |
| WO | WO 2012/065966 A1 | 5/2012 |

OTHER PUBLICATIONS

International Search Report issued Aug. 6, 2015 in PCT/EP2015/059140, filed Apr. 28, 2015.
Written Opinion issued Aug. 6, 2015 in PCT/EP2015/059140, filed Apr. 28, 2015.

\* cited by examiner

*Primary Examiner* — Daniel Lee
(74) *Attorney, Agent, or Firm* — Oblon, McClelland, Maier & Neustadt, L.L.P.

(57) ABSTRACT

The present invention relates to a multi-layered film for the application to a metal or plastic surface, comprising a protective layer (A) as a first layer, which is a poly(alkyl methacrylate) film comprising at least one hindered amine light stabilizer and at least two different ortho-hydroxy tris-aryl triazine UV absorbers selected from compounds of formulae (7) and (8); a barrier layer (B), a base layer (C), an adhesive layer (D) as last layer, and wherein barrier layer (B) and/or base layer (C) comprise at least one pigment. The multi-layered films are especially suitable for the application to the surface of automobiles.

15 Claims, No Drawings

MULTI-LAYERED FILM AND THE USE THEREOF

The present invention relates to a multi-layered film for the application to a metal or plastic surface, comprising a protective layer (A) as a first layer, which is a poly(alkyl methacrylate) film comprising at least one hindered amine light stabilizer and at least two different ortho-hydroxy tris-aryl triazine UV absorbers as defined below, a barrier layer (B), a base layer (C), an adhesive layer (D) as last layer, and wherein barrier layer (B) and/or base layer (C) comprise at least one pigment, as well as the use of multi-layered films as defined below for the application to the surface of an automobile.

To enhance the visual appearance of such surfaces the use of decorative films has become popular. Spray painting is the traditional method of applying a paint finish. However, spray printing of automobile parts is expensive and is poorly suited for surfacing plastic parts, which have become increasingly popular in the automobile industry. Furthermore, the trend in the automobile industry is away from large volume production of a few models to small volume production of many models, including very short runs of specialty models. Styling differentiation among the numerous models is also desired.

The use of decorative films, especially as a replacement of the traditional lacquers (usually applied by spray printing) can give mono-, multi-color, printing and versatile surface textures and can easily be adapted to varying needs, which may exist for example due to a great number of models, specialty models, or even individual models.

Desirable properties for such films would include high weatherability, high heat resistance, high light stability, high chemical resistance, high solvent resistance, high water resistance and high abrasion resistance. The decorative films should have most of the properties current paintings have. However current decorative films available in the market do not cover all these properties, especially with respect to weatherability. In addition to these properties the decorative films should have enough elongation to cover complex surfaces of automobiles and should be adherent for more than the life time of such automobiles. Furthermore, the films should also have a good flexibility and it should be possible to pigment such films without impairing the other desirable properties of the films. Overall, the durability of the films should be as high as possible.

On the other hand, it is desirable to reduce $CO_2$ and volatile organic compounds (VOC) emission, which can be achieved by the replacement of traditional lacquers.

Therefore, there is still a need for such films, especially those having improved properties.

The present invention relates to a multi-layered film for the application to a metal or plastic surface, comprising a protective layer (A) as a first layer, which is a poly(alkyl methacrylate) film comprising at least one hindered amine light stabilizer and at least two different ortho-hydroxy tris-aryl triazine UV absorbers selected from the compounds of formulae (7) and (8)

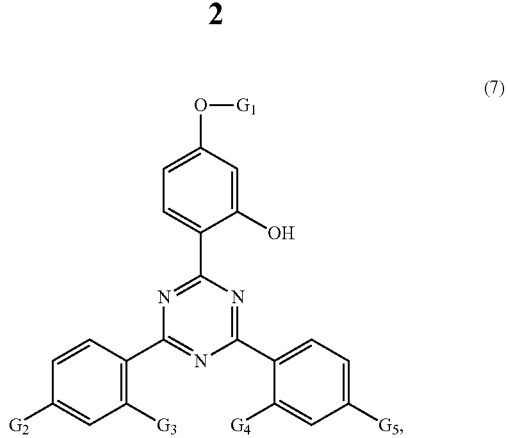

(7)

wherein $G_1$ is hydrogen, $C_1$-$C_{18}$alkyl, $C_1$-$C_{18}$alkyl substituted by 1, 2 or 3 radicals selected from the group consisting of —OH, $C_2$-$C_{18}$alkenyloxy, —C(O)OL$_1$ and —OC(O)L$_2$ with $L_1$ and $L_2$ being independently $C_1$-$C_{18}$alkyl; $C_3$-$C_{50}$alkyl interrupted by oxygen or $C_3$-$C_{50}$hydroxyalkyl interrupted by oxygen;

$G_2$, $G_3$, $G_4$ and $G_5$ are independently hydrogen, $C_1$-$C_{18}$alkyl, phenyl or phenyl substituted by 1, 2 or 3 $C_1$-$C_4$alkyl;

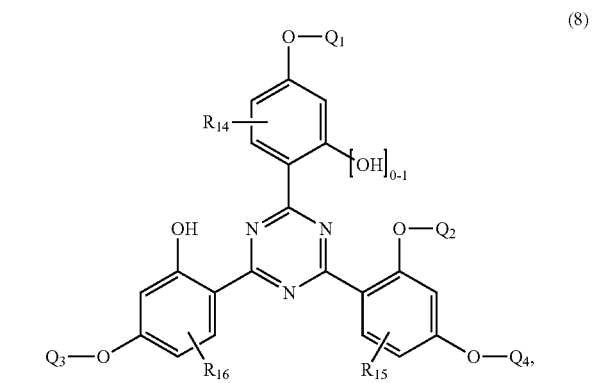

(8)

wherein $Q_1$, $Q_2$, $Q_3$ and $Q_4$ are independently hydrogen, $C_1$-$C_{18}$alkyl, $C_1$-$C_{18}$alkyl substituted by 1, 2 or 3 radicals selected from the group consisting of —OH, $C_2$-$C_{18}$alkenyloxy, —C(O)OY$_1$ and —OC(O)Y$_2$ with $Y_1$ and $Y_2$ being independently $C_1$-$C_{18}$alkyl; $C_3$-$C_{50}$alkyl interrupted by oxygen or $C_3$-$C_{50}$hydroxyalkyl interrupted by oxygen, and $R_{14}$, $R_{15}$ and $R_{16}$ are independently from each other hydrogen or $C_1$-$C_{18}$alkyl;

a barrier layer (B), a base layer (C), an adhesive layer (D) as last layer, and wherein barrier layer (B) and/or base layer (C) comprise at least one pigment.

Preferred hindered amine light stabilizers are those having a molecular weight of more than 200 g/mol, preferably more than 500 g/mol, especially more than 1,000 g/mol, and more preferably from more than 1,000 up to 100,000 g/mol, e.g. up to 50,000 g/mol. A molecular weight of 1,500 to 15,000 g/mol is especially preferred.

Preference is given to hindered amine light stabilizers, which are compounds of formula (1)

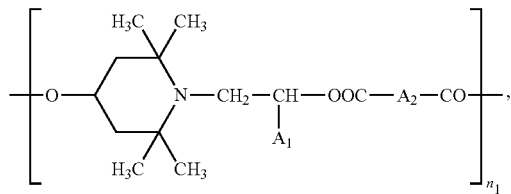

wherein $A_1$ is hydrogen or $C_1$-$C_4$alkyl,
$A_2$ is a direct bond or $C_1$-$C_{10}$alkylene, and
$n_1$ is a number from 2 to 50;
or compounds of the formula (2)

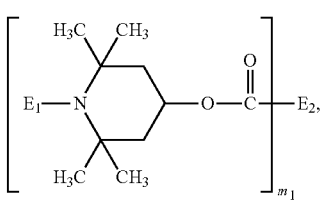

in which
$E_1$ is hydrogen, $C_1$-$C_8$alkyl, O., —OH, —CH$_2$CN, $C_1$-$C_{18}$alkoxy, hydroxyl-substituted $C_1$-$C_{18}$alkoxy, $C_5$-$C_{12}$cycloalkoxy, $C_3$-$C_6$alkenyl, $C_7$-$C_9$phenylalkyl unsubstituted or substituted on the phenyl by 1, 2 or 3 $C_1$-$C_4$alkyl; or $C_1$-$C_8$acyl,
$m_1$ is 1, 2 or 4,
if $m_1$ is 1, $E_2$ is $C_1$-$C_{25}$alkyl, a group of the formula —C(CH$_3$)=CH$_2$, or a group of the formula (2a)

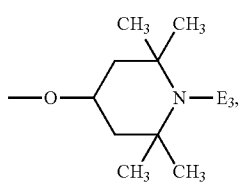

in which $E_3$ is as defined for $E_1$,
if $m_1$ is 2, $E_2$ is $C_1$-$C_{14}$alkylene or a group of the formula (2b)

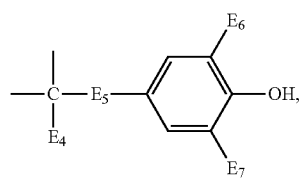

wherein $E_4$ is $C_1$-$C_{10}$alkyl or $C_2$-$C_{10}$alkenyl, $E_5$ is $C_1$-$C_{10}$alkylene, and
$E_6$ and $E_7$ independently of one another are $C_1$-$C_4$alkyl, cyclohexyl or methylcyclohexyl, and if $m_1$ is 4, $E_2$ is $C_4$-$C_{10}$alkanetetrayl;
or compounds of the formula (3)

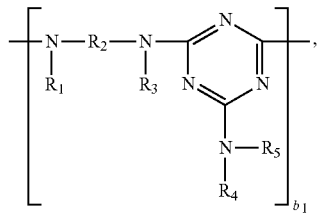

in which
$R_1$, $R_3$, $R_4$ and $R_5$ independently of one another are hydrogen, $C_1$-$C_{12}$alkyl, $C_5$-$C_{12}$cycloalkyl, $C_1$-$C_4$-alkyl-substituted $C_5$-$C_{12}$cycloalkyl, phenyl, phenyl which is substituted by —OH and/or $C_1$-$C_{10}$alkyl; $C_7$-$C_9$phenylalkyl, $C_7$-$C_9$phenylalkyl which is substituted on the phenyl radical by —OH and/or $C_1$-$C_{10}$alkyl; or a group of the formula (3a)

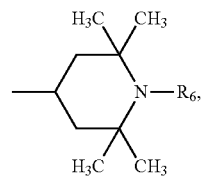

$R_2$ is $C_2$-$C_{18}$alkylene, $C_5$-$C_7$cycloalkylene or $C_1$-$C_4$alkylenedi($C_5$-$C_7$cycloalkylene), or the radicals $R_1$, $R_2$ and $R_3$, together with the nitrogen atoms to which they are bonded, perform a 5- to 10-membered heterocyclic ring, or $R_4$ and $R_5$, together with the nitrogen atom to which they are bonded, form a 5- to 10-membered heterocyclic ring, $R_6$ is hydrogen, $C_1$-$C_8$alkyl, O$^-$, —OH, —CH$_2$CN, $C_1$-$C_{18}$alkoxy, $C_5$-$C_{12}$cycloalkoxy, $C_3$-$C_6$alkenyl, $C_7$-$C_9$phenylalkyl unsubstituted or substituted on the phenyl by 1, 2 or 3 $C_1$-$C_4$alkyl; or $C_1$-$C_8$acyl, and $b_1$ is a number from 2 to 50, with the proviso that at least one of the radicals $R_1$, $R_3$, $R_4$ and $R_5$ is a group of the formula (3a);

or compounds of formula (4), (5) or (6)

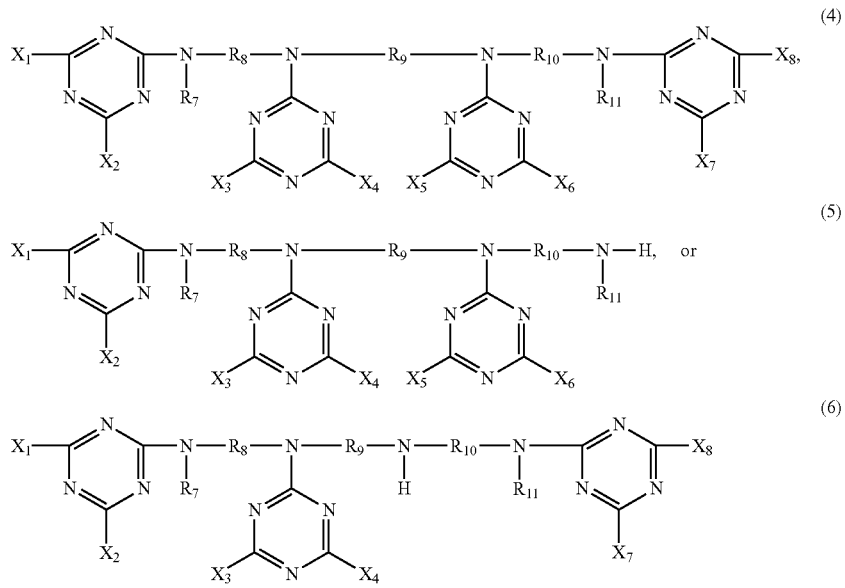

wherein
$R_7$ and $R_{11}$ independently of one another are hydrogen or $C_1$-$C_{12}$alkyl,
$R_8$, $R_9$ and $R_{10}$ independently of one another are $C_2$-$C_{10}$alkylene, and
$X_1$, $X_2$, $X_3$, $X_4$, $X_5$, $X_6$, $X_7$ and $X_8$ independently of one another are a group of the formula (4a),

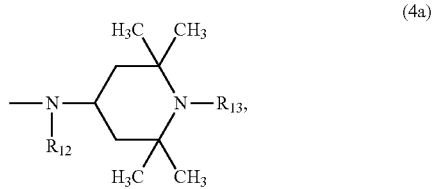

in which $R_{12}$ is hydrogen, $C_1$-$C_{12}$alkyl, $C_5$-$C_{12}$cycloalkyl, $C_1$-$C_4$alkyl-substituted $C_5$-$C_{12}$cycloalkyl, phenyl, —OH— and/or $C_1$-$C_{10}$alkyl-substituted phenyl, $C_7$-$C_9$phenylalkyl, $C_7$-$C_9$phenylalkyl which is substituted on the phenyl radical by —OH and/or $C_1$-$C_{10}$alkyl; or a group of the formula (3a) as defined above, and
$R_{13}$ is hydrogen, $C_1$-$C_8$alkyl, O—, —OH, —$CH_2CN$, $C_1$-$C_{18}$alkoxy, $C_5$-$C_{12}$cycloalkoxy, $C_3$-$C_6$alkenyl, $C_7$-$C_9$phenylalkyl unsubstituted or substituted on the phenyl by 1, 2 or 3 $C_1$-$C_4$alkyl; or $C_1$-$C_8$acyl.

Examples of alkyl having up to 25 carbon atoms are methyl, ethyl, propyl, isopropyl, n-butyl, sec-butyl, isobutyl, tert-butyl, 2-ethylbutyl, n-pentyl, isopentyl, 1-methylpentyl, 1,3-dimethylbutyl, n-hexyl, 1-methylhexyl, n-heptyl, isoheptyl, 1,1,3,3-tetramethylbutyl, 1-methylheptyl, 3-methylheptyl, n-octyl, 2-ethylhexyl, 1,1,3-trimethylhexyl, 1,1,3,3-tetramethylpentyl, nonyl, decyl, undecyl, 1-methylundecyl, dodecyl, 1,1,3,3,5,5-hexamethylhexyl, tridecyl, tetradecyl, pentadecyl, hexadecyl, heptadecyl, octadecyl and eicosyl. One of the preferred definitions of $E_1$, $R_6$ and $R_{13}$ is $C_1$-$C_4$alkyl, especially methyl.

Examples of alkoxy having up to 18 carbon atoms are methoxy, ethoxy, propoxy, isopropoxy, butoxy, isobutoxy, pentoxy, isopentoxy, hexoxy, heptoxy, octoxy, decyloxy, dodecyloxy, tetradecyloxy, hexadecyloxy and octadecyloxy. One of the preferred meanings of $E_1$ is octoxy and one of the preferred meanings of $R_6$ is propoxy.

Examples of $C_5$-$C_{12}$cycloalkyl are cyclopentyl, cyclohexyl, cycloheptyl, cyclooctyl and cyclododecyl. $C_5$-$C_8$Cycloalkyl, especially cyclohexyl, is preferred.

$C_1$-$C_4$Alkyl-substituted $C_5$-$C_{12}$cycloalkyl is for example methylcyclohexyl or dimethylcyclohexyl.

Examples of $C_5$-$C_{12}$cycloalkoxy are cyclopentoxy, cyclohexoxy, cycloheptoxy, cyclooctoxy, cyclodecyloxy and cyclododecyloxy. $C_5$-$C_8$Cycloalkoxy, in particular cyclopentoxy and cyclohexoxy, is preferred.

—OH— and/or $C_1C_{10}$alkyl-substituted phenyl is for example methylphenyl, dimethylphenyl, trimethylphenyl, tert-butylphenyl or 3,5-di-tert-butyl-4-hydroxyphenyl.

Examples of $C_7$-$C_9$phenylalkyl are benzyl and phenylethyl.

$C_7$-$C_9$Phenylalkyl which is substituted on the phenyl radical by —OH and/or by alkyl having up to 10 carbon atoms is for example methylbenzyl, dimethylbenzyl, trimethylbenzyl, tert-butylbenzyl or 3,5-di-tert-butyl-4-hydroxybenzyl.

Examples of alkenyl having up to 10 carbon atoms are allyl, 2-methallyl, butenyl, pentenyl and hexenyl. Allyl is preferred. The carbon atom in position 1 is preferably saturated.

Examples of acyl containing not more than 8 carbon atoms are formyl, acetyl, propionyl, butyryl, pentanoyl, hexanoyl, heptanoyl, octanoyl, acryloyl, methacryloyl and benzoyl. $C_1$-$C_8$Alkanoyl, $C_3$-$C_8$alkenyl and benzoyl are preferred. Acetyl and acryloyl are especially preferred.

Examples of alkylene having up to 18 carbon atoms are methylene, ethylene, propylene, trimethylene, tetramethylene, pentamethylene, 2,2-dimethyltrimethylene, hexamethylene, trimethylhexamethylene, octamethylene and decamethylene.

An example of C$_4$-C$_{10}$alkanetetrayl is 1,2,3,4-butanetetrayl.

An example of C$_5$-C$_7$cycloalkylene is cyclohexylene.

An example of C$_1$-C$_4$alkylenedi(C$_5$-C$_7$cycloalkylene) is methylenedicyclohexylene.

Where the radicals R$_1$, R$_2$ and R$_3$, together with the nitrogen atoms to which they are attached, form a 5- to 10-membered heterocyclic ring, this ring is for example

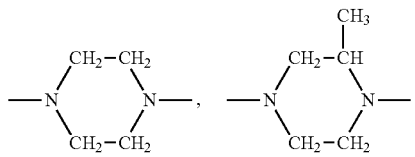

A 6-membered heterocyclic ring is preferred.

Where the radicals R$_4$ and R$_5$, together with the nitrogen atom to which they are attached, form a 5- to 10-membered heterocyclic ring, this ring is for example 1-pyrrolidyl, piperidino, morpholino, 1-piperazinyl, 4-methyl-1-piperazinyl, 1-hexahydroazepinyl, 5,5,7-trimethyl-1-homopiperazinyl or 4,5,5,7-tetramethyl-1-homopiperazinyl. Morpholino is particularly preferred.

$n_1$ is preferably a number from 2 to 25, in particular 2 to 20.

$b_1$ is preferably a number from 2 to 25, in particular 2 to 20.

Preferred as compound of formula (1) is the compound of formula

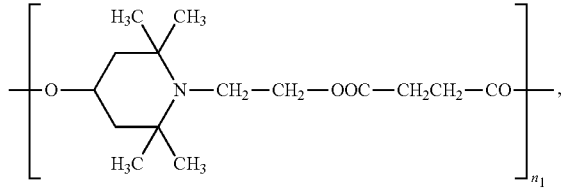

(1-A)

wherein $n_1$ is a number from 2 to 20.

Preferred as compound of formula (2) are the compounds of formulae

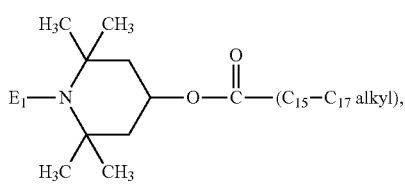

(2-A)

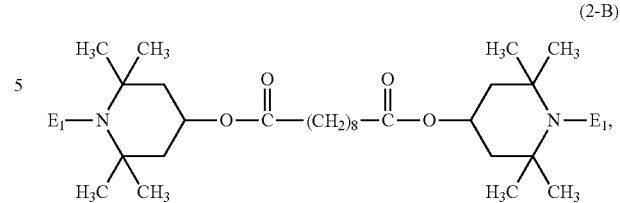

(2-B)

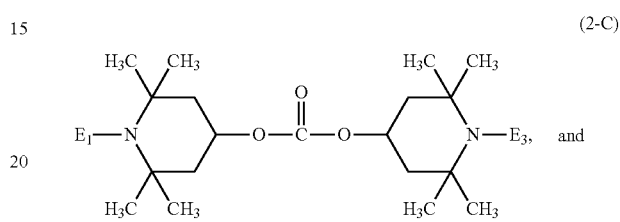

(2-C)

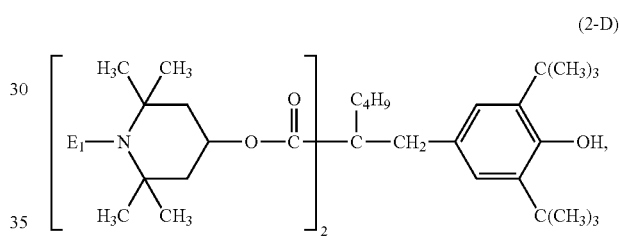

(2-D)

wherein E$_1$ and E$_3$ independently of each other are hydrogen, C$_1$-C$_8$alkyl, O—, —OH, —CH$_2$CN, C$_1$-C$_{18}$alkoxy, C$_5$-C$_{12}$cycloalkoxy, C$_3$-C$_6$alkenyl, C$_7$-C$_9$phenylalkyl unsubstituted or substituted on the phenyl by 1, 2 or 3 C$_1$-C$_4$alkyl; or C$_1$-C$_8$acyl.

Further preferred compounds of formula (2) are those, wherein $m_1$ is 1, E$_1$ is C$_1$-C$_{18}$alkoxy or hydroxyl-substituted C$_1$-C$_{18}$alkoxy and E$_2$ is C$_1$-C$_{25}$alkyl;

$m_1$ is 1, E$_1$ is hydrogen or methyl and E$_2$ is a group of the formula —C(CH$_3$)=CH$_2$.

Preferred as compound of formula (3) are the compounds of formulae

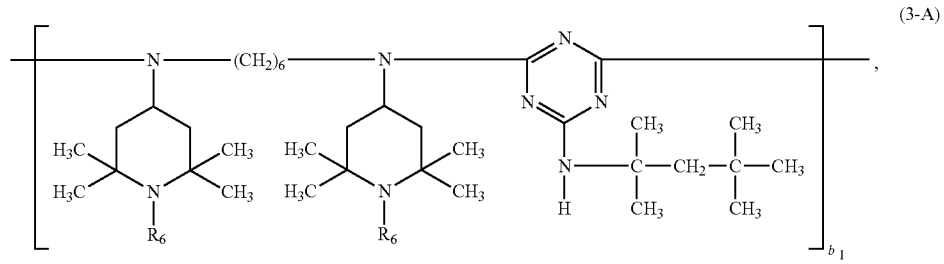

(3-A)

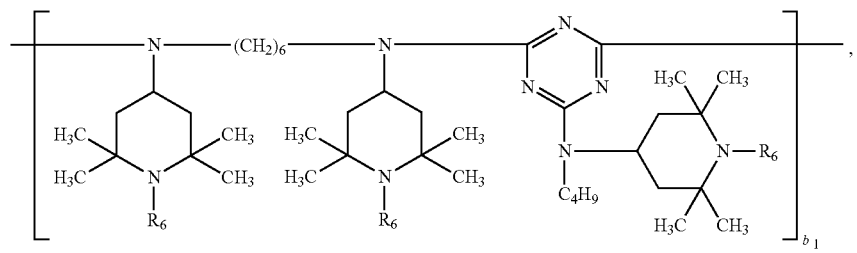

(3-B)

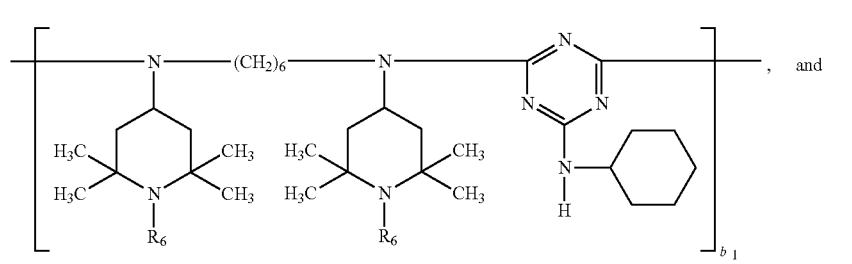

(3-C), and

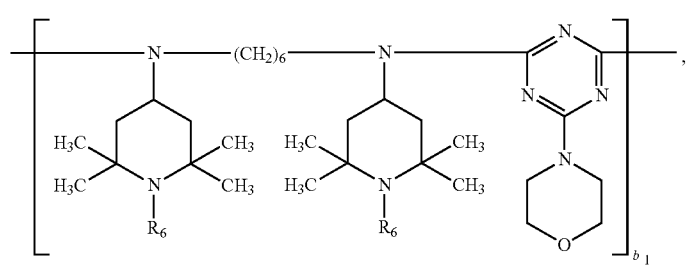

(3-D)

wherein $b_1$ is a number from 2 to 20 and $R_6$ is hydrogen, $C_1$-$C_8$alkyl, O—, —OH, —CH$_2$CN, $C_1$-$C_{18}$alkoxy, $C_5$-$C_{12}$cycloalkoxy, $C_3$-$C_6$alkenyl, $C_7$-$C_9$phenylalkyl unsubstituted or substituted on the phenyl by 1, 2 or 3 $C_1$-$C_4$alkyl; or $C_1$-$C_8$acyl.

Preferred as compound of formula (4) is the compound of formula $X_1$, $X_2$, $X_3$, $X_4$, $X_5$, $X_6$, $X_7$ and $X_8$ independently of one another are a group of the formula (4a), in which $R_{12}$ is butyl and $R_{13}$ is $C_1$-$C_{18}$alkoxy or $C_5$-$C_{12}$cycloalkoxy.

The meaning of the terminal groups which saturate the free valences in the compounds of formula (1), including those of formula (1-A), and the compounds of formula (3), including those of formulae (3-A), (3-B), (3-C) and (3-D),

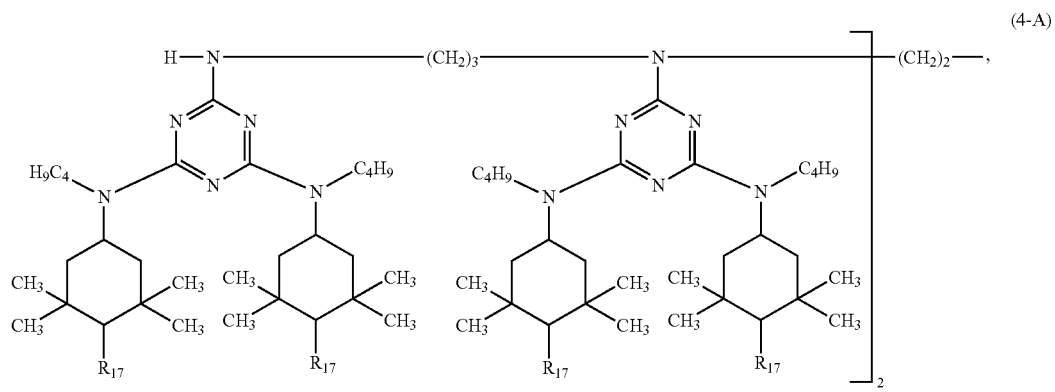

(4-A)

wherein $R_{17}$ has one of the meanings of $R_6$.

Preferred as compounds of formulae (5) and (6) are those, wherein $R_7$ and $R_{11}$ are hydrogen, $R_8$, $R_9$ and $R_{10}$ independently of one another are $C_2$-$C_3$alkylene, and depend on the processes used for their preparation. The terminal groups can also be modified after their preparation.

If the compounds of the formula (1) are prepared, for example, by reacting a compound of the formula

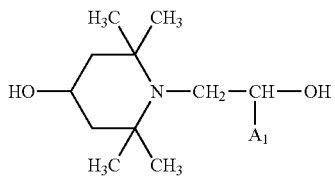

in which $A_1$ is hydrogen or methyl, with a dicarboxylic acid diester of the formula Y—OOC-$A_2$-COO—Y, in which Y is, for example, methyl, ethyl or propyl, and $A_2$ is as defined above, the terminal group bonded to the 2,2,6,6-tetramethyl-4-oxypiperidin-1-yl radical is hydrogen or —CO-$A_2$-COO—Y, and the terminal group bonded to the diacyl radical is —O—Y or

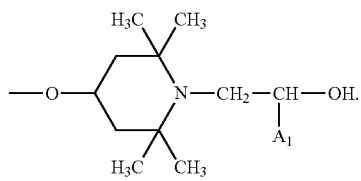

Preferred terminal groups for the compound of formula (1), including those of formula (1-A), are hydrogen and methoxy, ethoxy and propoxy, especially hydrogen and methoxy.

If the compounds of the formula (3) are prepared by reacting a compound of the formula

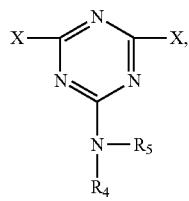

in which X is, for example, halogen, in particular chlorine, and $R_4$ and $R_5$ are as defined above, with a compound of the formula

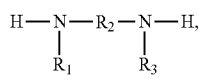

in which $R_1$, $R_2$ and $R_3$ are as defined above, the terminal group bonded to the diamino radical is hydrogen or

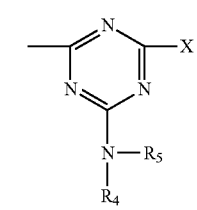

and the terminal group bonded to the triazine radical is X,

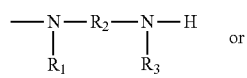

or

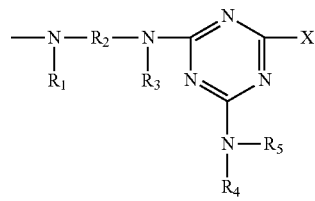

If X is halogen, it is advantageous to replace this, for example, by —OH or an amino group when the reaction is complete. Examples of amino groups which may be mentioned are pyrrolidin-1-yl, morpholino, —$NH_2$, —$N(C_1$-$C_8)$alkyl$)_2$ and —NR($C_1$-$C_8$alkyl), in which R is hydrogen or a group of the formula (3a).

This applies likewise to the compounds of formulae (3-A), (3-B), (3-C) and (3-D).

The compounds of the formula (3) also cover compounds of the formula

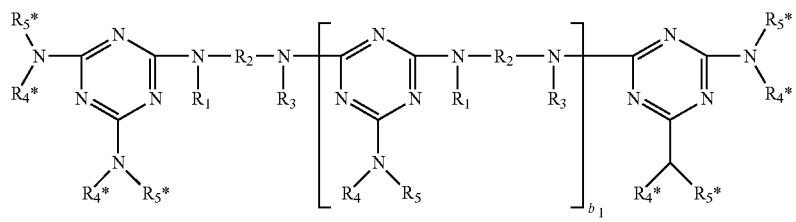

wherein $R_1$, $R_2$, $R_3$, $R_4$, $R_5$ and $b_1$ are as defined above and $R_4$* has one of the meanings of $R_4$ and $R_5$* has one of the meanings of $R_5$.

The hindered amine light stabilizer of formula (1) is more preferably TINUVIN® 622.

The hindered amine light stabilizer of formula (2) is more preferably TINUVIN® 123, TINUVIN® 144, TINUVIN® 765, TINUVIN® 770, ADK STAB® LA-81, 82 or 87.

The hindered amine light stabilizer of formula (3) is more preferably TINUVIN® NOR 371, CHIMASSORB® 944 or CHIMASSORB® 2020, especially TINUVIN® NOR 371.

The hindered amine light stabilizer of formula (4) is more preferably CHIMASSORB® 119.

The hindered amine light stabilizers of formulae (5) and (6) are more preferably FLAMESTAB® NOR 116.

Especially preferred as hindered amine light stabilizers are those of formulae (1), (2), (3), (4), (5) and (6), more preferably those of formulae (2), (3) and (4), and especially those of formula (3). As to each of these formulae the definitions and preferences given above apply.

The activity of such hindered amine light stabilizers, especially those of the NOR type, is not influenced by the external environment like acid rain and internal environment like desorption of chloride from polyvinylidene chloride. Furthermore, such hindered amine light stabilizers can provide heat stability to the films for the life time of automobiles.

Examples of $C_1$-$C_{18}$alkyl in formulae (7) and (8) are methyl, ethyl, propyl, isopropyl, n-butyl, sec-butyl, isobutyl, tert-butyl, 2-ethylbutyl, n-pentyl, isopentyl, 1-methylpentyl, 1,3-dimethylbutyl, n-hexyl, 1-methylhexyl, n-heptyl, iso-heptyl, 1,1,3,3-tetramethylbutyl, 1-methylheptyl, 3-methyl-heptyl, n-octyl, 2-ethylhexyl, 1,1,3-trimethylhexyl, 1,1,3,3-tetramethylpentyl, nonyl, decyl, undecyl, 1-methylundecyl, dodecyl, 1,1,3,3,5,5-hexamethylhexyl, tridecyl, tetradecyl, pentadecyl, hexadecyl, heptadecyl and octadecyl. $C_1$-$C_8$alkyl, for example methyl, n-butyl, tert.-butyl, n-hexyl, 2-ethylhexyl or an isomeric mixture of octyl, is particularly preferred.

Preferred examples of $C_1$-$C_{18}$alkyl, preferably $C_2$-$O_{18}$ alkyl, substituted by 1, 2 or 3 radicals selected from the group consisting of —OH, $C_2$-$C_{18}$alkenyloxy, —C(O)OL$_1$ (or —C(O)OY$_1$) and —OC(O)L$_2$ (or —OC(O)Y$_2$) in formulae (7) and (8) are 2-hydroxyethyl,

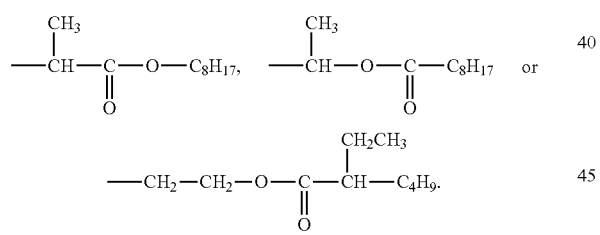

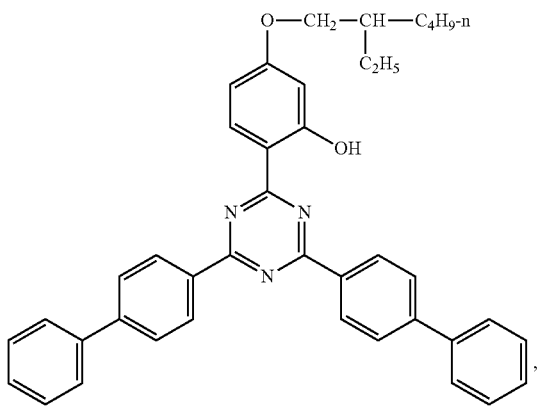

(7-A)

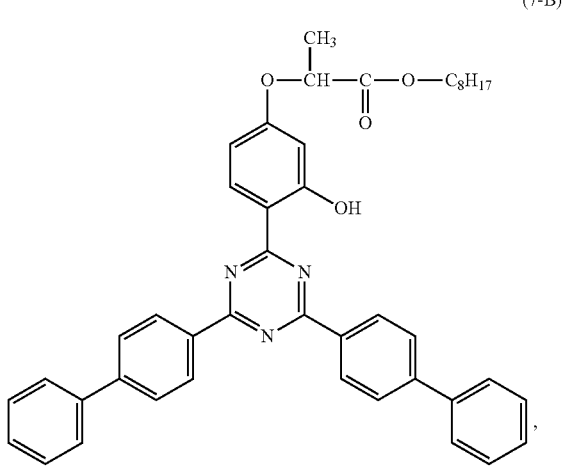

(7-B)

An example of $C_3$-$C_{50}$alkyl interrupted by one or more oxygen is —(CH$_2$CH$_2$—O—)$_3$—CH$_3$.

Preferred examples of $C_3$-$C_{50}$hydroxyalkyl interrupted by oxygen in formulae (7) and (8) are

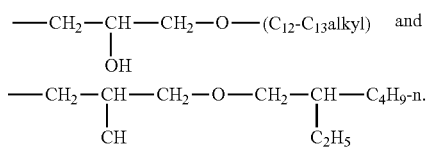

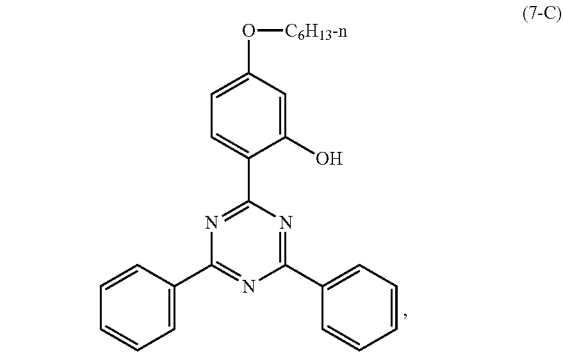

(7-C)

A preferred example of phenyl substituted by 1, 2 or 3 $C_1$-$C_4$alkyl in formula (7) is 2,4-dimethylphenyl.

The compound of the formula (7) is preferably a compound of the formula

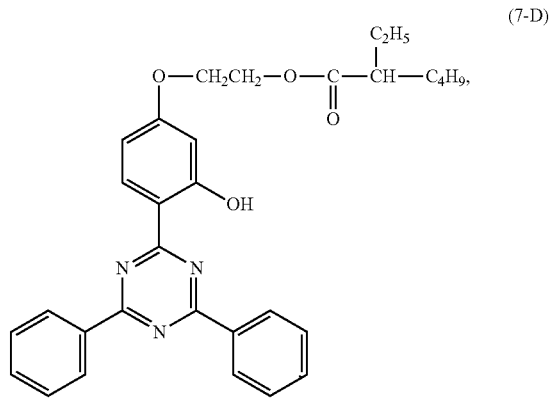

(7-D)

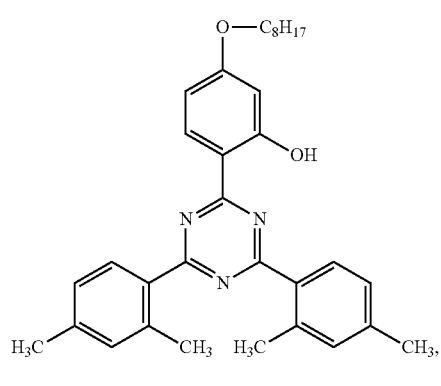
(7-E)
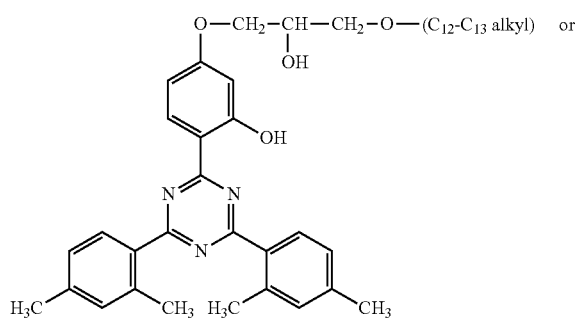
(7-F)
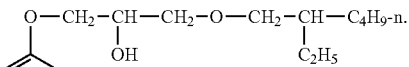
(7-G)
More preferably, the compound of formula (7) is a compound of formulae (7-A) to (7-D), especially a compound of formula (7-C).
Interesting commercially available compounds of formula (7) are TINUVIN® 479, TINUVIN® 1600, TINUVIN® 1577 and ADK STAB® LA-46.
The compound of the formula (8) is preferably a compound of the formula
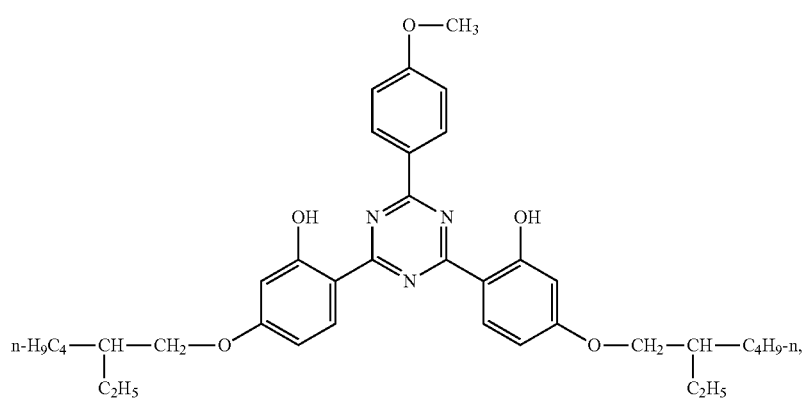
(8-A)
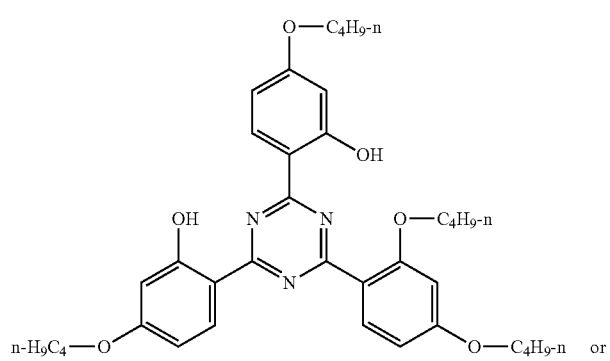
(8-B)

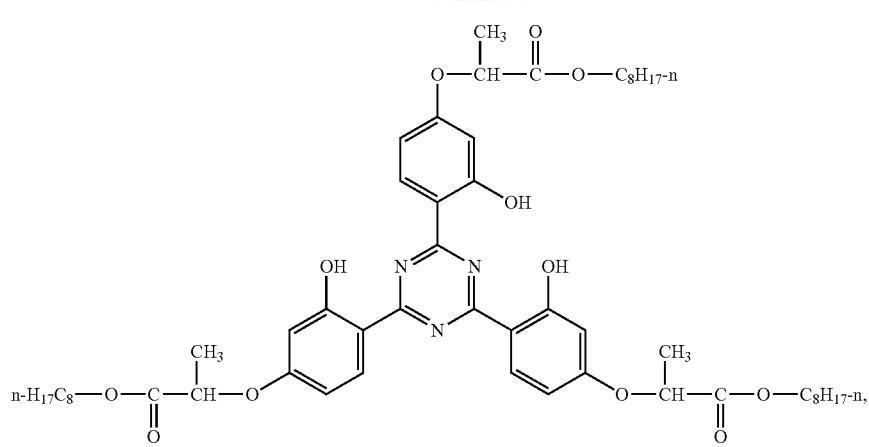

especially a compound of formula (8-B).

An interesting commercially available compound of formula (8) is TINUVIN® 460.

A further interesting commercially available UV absorber is ADK STAB® LA-1000.

It is preferred that the protective layer (A) comprises at least one ortho-hydroxy tris-aryl triazine UV absorber of formula (7) and at least one ortho-hydroxy tris-aryl triazine UV absorber of formula (8), whereby the above definitions and preferences apply.

An ortho-hydroxy tris-aryl triazine UV absorber of formula (8) absorbs at relatively longer wavelength of ultraviolet, whereas the absorption of other components of the films, like polyvinylidene chloride, polyurethane and some pigments, are weak at such wavelengths.

The compounds of formulae (1) to (8) described above are essentially known and commercially available, and can be prepared according to known processes.

As pigments, conventional inorganic or organic pigments can be used, like those given in "Gächter/Müller: Plastics Additives Handbook, 3rd Edition, Hanser Publishers, Munich Vienna N.Y.", pages 647 to 659, point 11. 2. 1. 1 to 11. 2. 4. 2.

Examples of inorganic pigments are titanium dioxide, zinc oxide, carbon black, cadmium sulfide, cadmium selenide, chromium oxide, iron oxide, lead oxide, bismuth vanadate and mixed metal oxides like Ni/Sb/Ti oxide, Cr/Sb/Ti oxide, Mn/Sb/Ti oxide, Sn/Zn/Ti oxide, Zn/Fe oxide, Fe/Cr oxide, Co/Al oxide, Co/Al/Cr oxide, Co/Ti/Ni/Zn oxide, Co/Cr/Fe/Mn oxide, pearl, metallic pigments etc.

Examples of organic pigments are azo pigments, especially disazo pigments, anthraquinones, phthalocyanines, tetrachloroisoindolinones, quinacridones, isoindolines, quinophthalones, pteridines, perylenes, pyrrolopyrroles, liquid crystal pigments etc.

Barrier layer (B) and/or base layer (C) comprise at least one pigment, being preferred that each of barrier layer (B) and base layer (C) comprises at least one pigment.

Poly(alkyl methacrylates) of protective layer (A) are preferably homo-, co- or terpolymers, especially homo- or copolymers, and preferably contain $C_1$-$C_{10}$-alkyl esters of methacrylic acid or acrylic acid as the monomer unit, or mixtures thereof. $C_1$-$C_4$-alkyl esters of methacrylic acid are preferred. Methyl methacrylate is particularly preferred, and is preferably employed in amounts of from 50 to 100 weight-%, especially 80 to 100 weight-% of the above monomer mixtures. The co- and/or termonomer, if any, is preferably chosen from alkyl esters of acrylic acid; $C_1$-$C_8$-alkyl esters of acrylic acid are preferred, which are preferably employed in amounts of from 0 to 50 weight-%, especially 0 to 20 weight-% of the above monomer mixtures. Examples of such $C_1$-$C_8$-alkyl esters of acrylic acid are methyl acrylate, ethyl acrylate, propyl acrylate, n-butyl acrylate, isobutyl acrylate, pentyl acrylate, hexyl acrylate, octyl acrylate and 2-ethylhexyl acrylate. Particularly preferred are poly(methyl methacrylates), especially those with a methyl methacrylate monomer content of 80 to 100 weight-%, preferably 90 to 100 weight-%, and optionally 0 to 20 weight-%, preferably 0 to 10 weight-% of $C_1$-$C_8$-alkyl esters of acrylic acid. In addition to the poly(alkyl methacrylates), protective layer (A) can contain a diene-based polymer. Such diene-based polymers are preferably those comprising 20 to 100 weight-% of 1,3-butadiene monomer units and 0 to 80 weight-% of other monomer units, especially those comprising 30 to 100 weight-% of 1,3-butadiene monomer units and 0 to 70 weight-% of other monomer units, and most preferably those comprising 50 to 100 weight-% of 1,3-butadiene monomer units and 0 to 50 weight-% of other monomer units. Examples of such other monomer units are styrene and derivatives thereof, like styrene, alpha-methylstyrene and p-methylstyrene; aromatic vinyl compounds, like vinyltoluene; $C_1$-$C_8$-alkyl esters of acrylic acid like methyl acrylate, ethyl acrylate, butyl acrylate and 2-ethylhexyl acrylate; $C_1$-$C_8$-alkyl esters of methacrylic acid like methyl methacrylate and ethyl methacrylate.

Protective layer (A) comprises preferably 0 to 50 weight-%, especially 1 to 50% and more preferably 5 to 50 weight-% of diene based polymers, based on the weight of protective layer (A).

Protective layer (A) is preferably transparent and is used to protect the other layers, especially against environmental conditions, like the deleterious effect of sunlight. Protective layer (A) is preferably present in the form of a film, especially a film having a thickness of 10 to 200 µm, preferably 20 to 200 µm and more preferably 20 to 100 µm.

The protective layer (A) contains the hindered amine light stabilizer(s) preferably in an amount of 0.005 to 5 weight-%, in particular 0.01 to 1 weight-% and especially 0.01 to 1 weight-%, relative to the weight of the protective layer (A).

In addition, protective layer (A) contains the ortho-hydroxy tris-aryl triazine UV absorbers preferably in an amount of 0.01 to 15 weight-%, in particular 0.1 to 10 weight-% and especially 0.1 to 5 weight-%, relative to the weight of the protective layer (A).

The barrier layer (B) is preferably used to reduce gas and moisture permeability, and is preferably a polyvinylidene chloride film, a cyclo olefin copolymer, polyethylenenaphthalate film or polyethylene or polypropylene film, especially a polyethylene or polypropylene film. According to a further embodiment of the present invention a polyvinylidene chloride film, a cyclo olefin copolymer or a polyethylenenaphthalate film are preferred.

Barrier layer (B) is preferably present in the form of a film, especially a film having a thickness of 10 to 200 μm, preferably 20 to 200 μm and more preferably 20 to 100 μm.

The barrier layer (B) may contain pigments and, if so, preferably in an amount of 0.5 to 20 weight-%, in particular 1 to 20 weight-% and especially 1 to 15 weight-%, relative to the weight of the barrier layer (B). Furthermore, it is also possible that complex designs are printed on barrier layer (B).

Furthermore, barrier layer (B) may also contain at least one hindered amine light stabilizer. If used, these are preferably present in barrier layer (B) in an amount of 0.005 to 5 weight-%, in particular 0.01 to 1 weight-% and especially 0.01 to 1 weight-%, relative to the weight of the barrier layer (B).

Base layer (C) is preferably a thermoplastic polyurethane resin. Base layer (C) is preferably present in the form of a film, especially a film having a thickness of 10 to 400 μm, preferably 20 to 200 μm and more preferably 100 to 200 μm.

Examples of polyurethane resins include resins obtained by carrying out a polymerization addition reaction between polyhydroxy compounds and polyisocyanate compounds. Here, specific examples of polyhydroxy compounds include: polyester polyols containing products of condensation reactions between phthalic acid, isophthalic acid, adipic acid, maleic acid, and other polybasic acids and ethylene glycol, propylene glycol, butylene glycol, diethylene glycol, trimethylol propane, glycerol, pentaerythritol, and other polyhydroxy compounds; polycaprolactone and other lactone-based polyester polyols; polyhexylene carbonate diol, polynonylene carbonate diol, polycyclohexylene carbonate diol, polydimethylcyclohexyl carbonate diol, and other polycarbonate polyols; and polyoxypropylene glycol, polyoxyethylene polyoxypropylene glycol, polyoxytetramethylene glycol, and other polyether polyols. Acrylic polyols, castor oil derivatives, and the like, are furthermore included. Moreover, ethylene glycol, propylene glycol, butanediol, neopentyl glycol, cyclohexane dimethanol, and other hydroxy compounds, and dimethylolpropionic acid, dimethylolbutanoic acid, and other carboxyl group-containing hydroxy compounds also are included. Examples of polyisocyanate compounds include toluene diisocyanate, diphenylmethane diisocyanate, xylylene diisocyanate, hexamethylene diisocyanate, dicyclohexylmethane diisocyanate, isophorone diisocyanate, and bis(methylisocyanate) cyclohexane.

The base layer (C) may contain pigments and, if so, preferably in an amount of 0.5 to 20 weight-%, in particular 1 to 20 weight-% and especially 1 to 15 weight-%, relative to the weight of the base layer (C). Furthermore, it is also possible that complex designs are printed on base layer (C).

Furthermore, base layer (C) may also contain at least one hindered amine light stabilizer. If used, these are preferably present in base layer (C) in an amount of 0.005 to 5 weight-%, in particular 0.01 to 1 weight-% and especially 0.01 to 1 weight-%, relative to the weight of the base layer (C).

According to a preferred embodiment barrier layer (B) and/or base layer (C) comprise at least one plasticizer. Such plasticizer can be used to improve elongation of the films, especially for the application of the films to complex shapes of surfaces.

Suitable plasticizers include, but are not limited to, phthalate esters, as well as adipates, azelates, phosphates, and epoxidized oil. A commonly used plasticizer is di(2-ethylhexyl) phthalate (DOP). Other useful plasticizers include tricresyl phosphate, dibutyl phthalate, dibutyl sebacate, tributyl phosphate, epoxidized esters, dioctyl phthalate, trioctyl phosphate, dioctyl sebacate and adipate, and various low-molecular weight polymers such as polypropylene glycol esters. Furthermore, oligomer type plasticizer, like Joncryl ADP1200, and polybutylacrylate polymers can be used.

It is preferred that plasticizers are used for base layer (C) and optionally for barrier layer (B).

The adhesive layer (D) can be any solvent or water based, hot melt, or extruded adhesive. The adhesive layer may for example be selected from polyurethane or polyacrylic adhesives, or polyisobutene. Polyurethane and polyisobutene, especially polyurethane, are preferred. Examples of polyurethane adhesives are Dispercoll® U (available from Bayer MaterialScience AG) as well as polyurethane adhesive as described in WO-A-2012/065966.

The adhesive layer (D) is preferably applied to base layer (C) by coating, and is preferably present in the form of a film, especially a film having a thickness of 1 to 100 μm, preferably 1 to 50 μm and more preferably 5 to 40 μm.

The multi-layered film according to the present invention may be prepared by laminating layers (A), (B) and (C), and then coating of base layer (C) with the adhesive layer (D).

Lamination may be carried out according to conventional methods, where the individual layers are combined with one another by vacuum deposition, lamination, extrusion lamination (adhesive lamination, melt lamination, or hotmelt lamination). It is preferred to carry out lamination by adhesive lamination, like wet or dry lamination (it being possible to use the adhesives given above for adhesive layer (D)).

The adhesive layer (D) can be applied, for example, by means of roll-application processes in the lamination process, or by means of a die in the extrusion lamination process.

If desired, each of layers (A) to (D) may further contain one or more conventional additives. Suitable examples are listed in the following.

1. Antioxidants 1.1. Alkylated monophenols, for example 2,6-di-tert-butyl-4-methylphenol, 2-tert-butyl-4,6-dimethylphenol, 2,6-di-tert-butyl-4-ethylphenol, 2,6-di-tert-butyl-4-n-butylphenol, 2,6-di-tert-butyl-4-isobutylphenol, 2,6-dicyclopentyl-4-methylphenol, 2-(α-methylcyclohexyl)-4,6-dimethylphenol, 2,6-dioctadecyl-4-methylphenol, 2,4,6-tricyclohexylphenol, 2,6-di-tert-butyl-4-methoxymethylphenol, nonylphenols which are linear or branched in the side chains, for example, 2,6-di-nonyl-4-methylphenol, 2,4-dimethyl-6-(1'-methylundec-1-yl)phenol, 2,4-dimethyl-6-(1-methylheptadec-1'-yl)phenol, 2,4-dimethyl-6-(1'-methyltridec-1-yl)phenol and mixtures thereof.

1.2. Alkylthiomethylphenols, for example 2,4-dioctylthiomethyl-6-tert-butylphenol, 2,4-dioctylthiomethyl-6-methylphenol, 2,4-dioctylthiomethyl-6-ethylphenol, 2,6-didodecylthiomethyl-4-nonylphenol.

1.3. Hydroquinones and alkylated hydroquinones, for example 2,6-di-tert-butyl-4-methoxyphenol, 2,5-di-tert-butylhydroquinone, 2,5-di-tert-amylhydroquinone, 2,6-diphenyl-4-octade-cyloxyphenol, 2,6-di-tert-butylhydroquinone, 2,5-di-tert-butyl-4-hydroxyanisole, 3,5-di-tert-butyl-4-hydroxyanisole, 3,5-di-tert-butyl-4-hydroxyphenyl stearate, bis(3,5-di-tert-butyl-4-hydroxyphenyl) adipate.

1.4. Tocopherols, for example α-tocopherol, β-tocopherol, γ-tocopherol, δ-tocopherol and mixtures thereof (vitamin E).

1.5. Hydroxylated thiodiphenyl ethers, for example 2,2'-thiobis(6-tert-butyl-4-methylphenol), 2,2'-thiobis(4-octylphenol), 4,4'-thiobis(6-tert-butyl-3-methylphenol), 4,4'-thiobis(6-tert-butyl-2-methylphenol), 4,4'-thiobis(3,6-di-sec-amylphenol), 4,4'-bis(2,6-dimethyl-4-hydroxyphenyl)-disulfide.

1.6. Alkylidenebisphenols, for example 2,2'-methylenebis(6-tert-butyl-4-methylphenol), 2,2'-methylenebis(6-tert-butyl-4-ethylphenol), 2,2'-methylenebis[4-methyl-6-(α-methylcyclohexyl)-phenol], 2,2'-methylenebis(4-methyl-6-cyclohexylphenol), 2,2'-methylenebis(6-nonyl-4-methylphenol), 2,2'-methylenebis(4,6-di-tert-butylphenol), 2,2'-ethylidenebis(4,6-di-tert-butylphenol), 2,2'-ethylidenebis(6-tert-butyl-4-isobutylphenol), 2,2'-methylenebis[6-(α-methylbenzyl)-4-nonylphenol], 2,2'-methylenebis[6-(α,α-dimethylbenzyl)-4-nonylphenol], 4,4'-methylenebis(2,6-di-tert-butylphenol), 4,4'-methylenebis(6-tert-butyl-2-methylphenol), 1,1-bis(5-tert-butyl-4-hydroxy-2-methylphenyl)butane, 2,6-bis(3-tert-butyl-5-methyl-2-hydroxybenzyl)-4-methylphenol, 1,1,3-tris(5-tert-butyl-4-hydroxy-2-methylphenyl)butane, 1,1-bis(5-tert-butyl-4-hydroxy-2-methyl-phenyl)-3-n-dodecylmercaptobutane, ethylene glycol bis[3,3-bis(3'-tert-butyl-4'-hydroxyphenyl)butyrate], bis(3-tert-butyl-4-hydroxy-5-methyl-phenyl)dicyclopentadiene, bis[2-(3'-tert-butyl-2'-hydroxy-5'-methylbenzyl)-6-tert-butyl-4-methylphenyl]terephthalate, 1,1-bis-(3,5-dimethyl-2-hydroxyphenyl)butane, 2,2-bis(3,5-di-tert-butyl-4-hydroxyphenyl)propane, 2,2-bis(5-tert-butyl-4-hydroxy2-methylphenyl)-4-n-dodecylmercaptobutane, 1,1,5,5-tetra-(5-tert-butyl-4-hydroxy-2-methylphenyl) pentane.

1.7. O-, N- and S-benzyl compounds, for example 3,5,3',5'-tetra-tert-butyl-4,4'-dihydroxydibenzyl ether, octadecyl-4-hydroxy-3,5-dimethylbenzylmercaptoacetate, tridecyl-4-hydroxy-3,5-di-tert-butylbenzylmercaptoacetate, tris(3,5-di-tert-butyl-4-hydroxybenzyl)amine, bis(4-tert-butyl-3-hydroxy-2,6-dimethylbenzyl)dithioterephthalate, bis(3,5-di-tert-butyl-4-hydroxybenzyl)sulfide, isooctyl-3,5-di-tert-butyl-4-hydroxybenzylmercaptoacetate.

1.8. Hydroxybenzylated malonates, for example dioctadecyl-2,2-bis(3,5-di-tert-butyl-2-hydroxybenzyl)malonate, di-octadecyl-2-(3-tert-butyl-4-hydroxy-5-methylbenzyl) malonate, didodecylmercaptoethyl-2,2-bis (3,5-di-tert-butyl-4-hydroxybenzyl)malonate, bis[4-(1,1,3,3-tetramethylbutyl)phenyl]-2,2-bis(3,5-di-tert-butyl-4-hydroxybenzyl)malonate.

1.9. Aromatic hydroxybenzyl compounds, for example 1,3,5-tris(3,5-di-tert-butyl-4-hydroxybenzyl)-2,4,6-trimethylbenzene, 1,4-bis(3,5-di-tert-butyl-4-hydroxybenzyl)-2,3,5,6-tetramethylbenzene, 2,4,6-tris(3,5-di-tert-butyl-4-hydroxybenzyl)phenol.

1.10. Triazine compounds, for example 2,4-bis(octylmercapto)-6-(3,5-di-tert-butyl-4-hydroxyanilino)-1,3,5-triazine, 2-octylmercapto-4,6-bis(3,5-di-tert-butyl-4-hydroxyanilino)-1,3,5-triazine, 2-octylmercapto-4,6-bis(3,5-di-tert-butyl-4-hydroxyphenoxy)-1,3,5-triazine, 2,4,6-tris(3,5-di-tert-butyl-4-hydroxyphenoxy)-1,2,3-triazine, 1,3,5-tris(3,5-di-tert-butyl-4-hydroxybenzyl)isocyanurate, 1,3,5-tris(4-tert-butyl-3-hydroxy-2,6-dimethylbenzyl)isocyanurate, 2,4,6-tris(3,5-di-tert-butyl-4-hydroxyphenylethyl)-1,3,5-triazine, 1,3,5-tris(3,5-di-tert-butyl-4-hydroxyphenylpropionyl)-hexahydro-1,3,5-triazine, 1,3,5-tris(3,5-dicyclohexyl-4-hydroxybenzyl)isocyanurate.

1.11. Benzylphosphonates, for example dimethyl-2,5-di-tert-butyl-4-hydroxybenzylphosphonate, diethyl-3,5-di-tert-butyl-4-hydroxybenzylphosphonate, dioctadecyl3,5-di-tert-butyl-4-hydroxybenzylphosphonate, dioctadecyl-5-tert-butyl-4-hydroxy-3-methylbenzylphosphonate, the calcium salt of the monoethyl ester of 3,5-di-tert-butyl-4-hydroxybenzylphosphonic acid.

1.12. Acylaminophenols, for example 4-hydroxylauranilide, 4-hydroxystearanilide, octyl N-(3,5-di-tert-butyl-4-hydroxyphenyl)carbamate.

1.13. Esters of β-(3,5-di-tert-butyl-4-hydroxyphenyl)propionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.14. Esters of β-(5-tert-butyl-4-hydroxy-3-methylphenyl) propionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis-(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane; 3,9-bis[2-{3-(3-tert-butyl-4-hydroxy-5-methylphenyl)propionyloxy}-1,1-dimethylethyl]-2,4,8,10-tetraoxaspiro[5.5]-undecane.

1.15. Esters of β-(3,5-dicyclohexyl-4-hydroxyphenyl)propionic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.16. Esters of 3,5-di-tert-butyl-4-hydroxyphenyl acetic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.17. Amides of β-(3,5-di-tert-butyl-4-hydroxyphenyl)propionic acid e.g. N,N'-bis(3,5-di-tert-butyl-4-hydroxyphenylpropionyl)hexamethylenediamide, N,N'-bis(3,5-di-tert-butyl-4-hydroxyphenylpropionyl) trimethylenediamide, N,N'-bis(3,5-di-tert-butyl-4- hydroxyphenylpropionyl)hydrazide, N,N'-bis[2-(3-[3,5-di-tert-butyl-4-hydroxyphenyl]propionyloxy)ethyl]oxamide (Naugard®XL-1, supplied by Uniroyal).

1.18. Ascorbic acid (vitamin C)

1.19. Aminic antioxidants, for example N,N'-di-isopropyl-p-phenylenediamine, N,N'-di-sec-butyl-p-phenylenediamine, N,N'-bis(1,4-dimethylpentyl)-p-phenylenediamine, N,N'-bis(1-ethyl-3-methylpentyl)-p-phenylenediamine, N,N'-bis(1-methylheptyl)-p-phenylenediamine, N,N'-dicyclohexyl-p-phenylenediamine, N,N'-diphenyl-p-phenylenediamine, N,N'-bis(2-naphthyl)-p-phenylenediamine, N-isopropyl-N'-phenyl-p-phenylenediamine, N-(1,3-dimethylbutyl)-N'-phenyl-p-phenylenediamine, N-(1-methylheptyl)-N'-phenyl-p-phenylenediamine, N-cyclohexyl-N'-phenyl-p-phenylenediamine, 4-(p-toluenesulfamoyl)diphenylamine, N,N'-dimethyl-N,N'-di-sec-butyl-p-phenylenediamine, diphenylamine, N-allyldiphenylamine, 4-isopropoxydiphenylamine, N-phenyl-1-naphthylamine, N-(4-tert-octylphenyl)-1-naphthylamine, N-phenyl-2-naphthylamine, octylated diphenylamine, for example p,p'-di-tert-octyldiphenylamine, 4-n-butylaminophenol, 4-butyrylaminophenol, 4-nonanoylaminophenol, 4-dodecanoylaminophenol, 4-octadecanoylaminophenol, bis(4-methoxyphenyl)amine, 2,6-di-tert-butyl-4-dimethylaminomethylphenol, 2,4'-diaminodiphenylmethane, 4,4'-diaminodiphenylmethane, N,N,N',N'-tetramethyl-4,4'-diaminodiphenylmethane, 1,2-bis[(2-methylphenyl)amino]ethane, 1,2-bis(phenylamino)propane, (o-tolyl)biguanide, bis[4-(1',3'-dimethylbutyl)phenyl]amine, tert-octylated N-phenyl-1-naphthylamine, a mixture of mono- and dialkylated tert-butyl/tert-octyldiphenylamines, a mixture of mono- and dialkylated nonyldiphenylamines, a mixture of mono- and dialkylated dodecyldiphenylamines, a mixture of mono- and dialkylated isopropyl/isohexyldiphenylamines, a mixture of mono- and dialkylated tert-butyldiphenylamines, 2,3-dihydro-3,3-dimethyl-4H-1,4-benzothiazine, phenothiazine, a mixture of mono- and dialkylated tert-butyl/tert-octylphenothiazines, a mixture of mono- and dialkylated tert-octyl-phenothiazines, N-allylphenothiazine, N,N,N',N'-tetraphenyl-1,4-diaminobut-2-ene.

2. UV Absorbers and Light Stabilizers 2.1. 2-(2'-Hydroxyphenyl)benzotriazoles, for example 2-(2'-hydroxy-5'-methylphenyl)-benzotriazole, 2-(3',5'-di-tert-butyl-2'-hydroxyphenyl)benzotriazole, 2-(5'-tert-butyl-2'-hydroxyphenyl)benzotriazole, 2-(2'-hydroxy-5'-(1,1,3,3-tetramethylbutyl)phenyl)benzotriazole, 2-(3',5'-di-tert-butyl-2'-hydroxyphenyl)-5-chloro-benzotriazole, 2-(3'-tert-butyl-2'-hydroxy-5'-methylphenyl)-5-chloro-benzotriazole, 2-(3'-sec-butyl-5'-tert-butyl-2'-hydroxyphenyl)benzotriazole, 2-(2'-hydroxy-4'-octyloxyphenyl)benzotriazole, 2-(3',5'-di-tert-amyl-2'-hydroxyphenyl)benzotriazole, 2-(3',5'-bis-(α,α-dimethylbenzyl)-2'-hydroxyphenyl)benzotriazole, 2-(3'-tert-butyl-2'-hydroxy-5'-(2-octyloxycarbonylethyl)phenyl)-5-chloro-benzotriazole, 2-(3'-tert-butyl-5'-[2-(2-ethylhexyloxy)-carbonylethyl]-2'-hydroxyphenyl)-5-chloro-benzotriazole, 2-(3'-tert-butyl-2'-hydroxy-5'-(2-methoxycarbonylethyl)phenyl)-5-chloro-benzotriazole, 2-(3'-tert-butyl-2'-hydroxy-5'-(2-methoxycarbonylethyl)phenyl)benzotriazole, 2-(3'-tert-butyl-2'-hydroxy-5'-(2-octyloxycarbonylethyl)phenyl)benzotriazole, 2-(3'-tert-butyl-5'-[2-(2-ethylhexyloxy)carbonylethyl]-2'-hydroxyphenyl)benzotriazole, 2-(3'-dodecyl-2'-hydroxy-5'-methylphenyl)benzotriazole, 2-(3'-tert-butyl-2'-hydroxy-5'-(2-isooctyloxycarbonylethyl) phenylbenzotriazole, 2,2'-methylene-bis[4-(1,1,3,3-tetramethylbutyl)-6-benzotriazole-2-ylphenol]; the transesterification product of 2-[3'-tert-butyl-5'-(2-methoxycarbonylethyl)-2'-hydroxyphenyl]-2H-benzotriazole with polyethylene glycol 300;

$$[R-CH_2CH_2-COO-CH_2CH_2]_2-,$$

where R=3'-tert-butyl-4'-hydroxy-5'-2H-benzotriazol-2-ylphenyl, 2-[2'-hydroxy-3'-(α,α-dimethylbenzyl)-5'-(1,1,3,3-tetramethylbutyl)-phenyl]-benzotriazole; 2-[2'-hydroxy-3'-(1,1,3,3-tetramethylbutyl)-5'-(α,α-dimethylbenzyl)-phenyl]benzotriazole.

2.2. 2-Hydroxybenzophenones, for example the 4-hydroxy, 4-methoxy, 4-octyloxy, 4-decyloxy, 4-dodecyloxy, 4-benzyloxy, 4,2',4'-trihydroxy and 2'-hydroxy-4,4'-dimethoxy derivatives.

2.3. Esters of substituted and unsubstituted benzoic acids, for example 4-tert-butyl-phenyl salicylate, phenyl salicylate, octylphenyl salicylate, dibenzoyl resorcinol, bis(4-tert-butylbenzoyl)resorcinol, benzoyl resorcinol, 2,4-di-tert-butylphenyl 3,5-di-tert-butyl-4-hydroxybenzoate, hexadecyl 3,5-di-tert-butyl-4-hydroxybenzoate, octadecyl 3,5-di-tert-butyl-4-hydroxybenzoate, 2-methyl-4,6-di-tert-butylphenyl 3,5-di-tert-butyl-4-hydroxybenzoate.

2.4. Acrylates, for example ethyl α-cyano-β,β-diphenylacrylate, isooctyl α-cyano-β,β-diphenylacrylate, methyl α-carbomethoxycinnamate, methyl α-cyano-β-methyl-p-methoxycinnamate, butyl α-cyano-β-methyl-p-methoxycinnamate, methyl α-carbomethoxy-p-methoxycinnamate, N-β-carbomethoxy-β-cyanovinyl)-2-methylindoline, neopentyl tetra(α-cyano-β,β-diphenylacrylate.

2.5. Nickel compounds, for example nickel complexes of 2,2'-thio-bis[4-(1,1,3,3-tetramethylbutyl)phenol], such as the 1:1 or 1:2 complex, with or without additional ligands such as n-butylamine, triethanolamine or N-cyclohexyldiethanolamine, nickel dibutyldithiocarbamate, nickel salts of the monoalkyl esters, e.g. the methyl or ethyl ester, of 4-hydroxy-3,5-di-tert-butylbenzylphosphonic acid, nickel complexes of ketoximes, e.g. of 2-hydroxy-4-methylphenylundecylketoxime, nickel complexes of 1-phenyl-4-lauroyl-5-hydroxypyrazole, with or without additional ligands.

2.6. Oxamides, for example 4,4'-dioctyloxyoxanilide, 2,2'-diethoxyoxanilide, 2,2'-dioctyloxy-5,5'-di-tert-butoxanilide, 2,2'-didodecyloxy-5,5'-di-tert-butoxanilide, 2-ethoxy-2'-ethyloxanilide, N,N'-bis(3-dimethylaminopropyl)oxamide, 2-ethoxy-5-tert-butyl-2'-ethoxanilide and its mixture with 2-ethoxy-2'-ethyl-5,4'-di-tert-butoxanilide, mixtures of o- and p-methoxy-disubstituted oxanilides and mixtures of o- and p-ethoxy-disubstituted oxanilides.

2.7. 2-(2-Hydroxyphenyl)-1,3,5-triazines, for example 2,4,6-tris(2-hydroxy-4-octyloxyphenyl)-1,3,5-triazine, 2-(2-hydroxy-4-octyloxyphenyl)-4,6-bis(2,4-dimethylphenyl)-1,3,5-triazine, 2-(2,4-dihydroxyphenyl)-4,6-bis(2,4-dimethylphenyl)-1,3,5-triazine, 2,4-bis(2-hydroxy-4-propyloxyphenyl)-6-(2,4-dimethylphenyl)-1,3,5-triazine, 2-(2-hydroxy-4-octyloxyphenyl)-4,6-bis(4-methylphenyl)-1,3,5-triazine, 2-(2-hydroxy-4-dodecyloxyphenyl)-4,6-bis(2,4-dimethylphenyl)-1,3,5-triazine, 2-(2-hydroxy-4-tridecyloxyphenyl)-4,6-bis(2,4-dimethylphenyl)-1,3,5-triazine, 2-[2-hydroxy-4-(2-hydroxy-3-butyloxypropoxy)phenyl]-4,6-bis(2,4-dimethyl)-1,3,5-triazine, 2-[2-hydroxy-4-(2-hydroxy-3- octyloxypropyloxy)phenyl]-4,6-bis(2,4-dimethyl)-1,3,5-triazine, 2-[4-(dodecyloxy/tridecyloxy-2-hydroxypropoxy)-2-hydroxyphenyl]-4,6-bis(2,4-dimethylphenyl)-1,3,5-triazine, 2-[2-hydroxy-4-(2-hydroxy-3-dodecyloxypropoxy)phenyl]-4,6-bis(2,4-dimethylphenyl)-1,3,5-triazine, 2-(2-hydroxy-4-hexyloxy)phenyl-4,6-diphenyl-1,3,5-triazine, 2-(2-hydroxy-4-methoxyphenyl)-4,6-diphenyl-1,3,5-triazine, 2,4,6-tris[2-hydroxy-4-(3-butoxy-2-hydroxypropoxy)phenyl]-1,3,5-triazine, 2-(2-hydroxyphenyl)-4-(4-methoxyphenyl)-6-phenyl-1,3,5-triazine, 2-{2-hydroxy-4-[3-(2-ethylhexyl-1-oxy)-2-hydroxypropyloxy]phenyl}-4,6-bis(2,4-dimethylphenyl)-1,3,5-triazine, 2,4-bis(4-[2-ethylhexyloxy]-2-hydroxyphenyl)-6-(4-methoxyphenyl)-1,3,5-triazine.
  2.8. Quinoline derivatives such as e.g. the commercially available UVINUL® S-Pack.
3. Metal deactivators, for example N,N'-diphenyloxamide, N-salicylal-N'-salicyloyl hydrazine, N,N'-bis(salicyloyl) hydrazine, N,N'-bis(3,5-di-tert-butyl-4-hydroxyphenyl-propionyl)hydrazine, 3-salicyloylamino-1,2,4-triazole, bis(benzylidene)oxalyl dihydrazide, oxanilide, isophthaloyl dihydrazide, sebacoyl bisphenylhydrazide, N,N'-diacetyladipoyl dihydrazide, N,N'-bis(salicyloyl)oxalyl dihydrazide, N,N'-bis(salicyloyl)thiopropionyl dihydrazide.
4. Phosphites and phosphonites, for example triphenyl phosphite, diphenylalkyl phosphites, phenyldialkyl phosphites, tris(nonylphenyl) phosphite, trilauryl phosphite, trioctadecyl phosphite, distearylpentaerythritol diphosphite, tris(2,4-di-tert-butylphenyl) phosphite, diisodecyl pentaerythritol diphosphite, bis(2,4-di-tert-butylphenyl)pentaerythritol diphosphite, bis(2,4-dicumylphenyl)pentaerythritol diphosphite, bis(2,6-di-tert-butyl-4-methylphenyl)pentaerythritol diphosphite, diisodecyloxypentaerythritol diphosphite, bis(2,4-di-tert-butyl-6-methylphenyl)-pentaerythritol diphosphite, bis(2,4,6-tris(tert-butylphenyl)pentaerythritol diphosphite, tristearyl sorbitol triphosphite, tetrakis(2,4-di-tert-butylphenyl) 4,4'-biphenylene diphosphonite, 6-isooctyloxy-2,4,8,10-tetra-tert-butyl-12H-dibenz[d,g]-1,3,2-dioxaphosphocin, bis(2,4-di-tert-butyl-6-methylphenyl)methyl phosphite, bis(2,4-di-tert-butyl-6-methylphenyl)ethyl phosphite, 6-fluoro-2,4,8,10-tetra-tert-butyl-12-methyl-dibenz[d,g]-1,3,2-dioxaphosphocin, 2,2',2"-nitrilo-[triethyltris(3,3',5,5'-tetra-tert-butyl-1,1'-biphenyl-2,2'-diyl) phosphite], 2-ethylhexyl(3,3',5,5'-tetratert-butyl-1,1'-biphenyl-2,2'-diyl)phosphite, 5-butyl-5-ethyl-2-(2,4,6-tritert-butylphenoxy)-1,3,2-dioxaphosphirane.

The following phosphites are especially preferred:
Tris(2,4-di-tert-butylphenyl) phosphite (Irgafos 168), tris(nonylphenyl) phosphite,

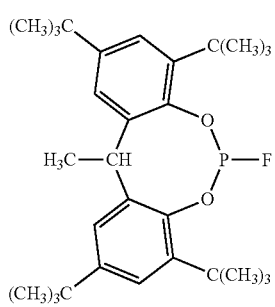
(A)

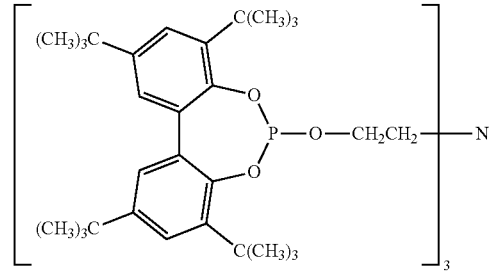
(B)

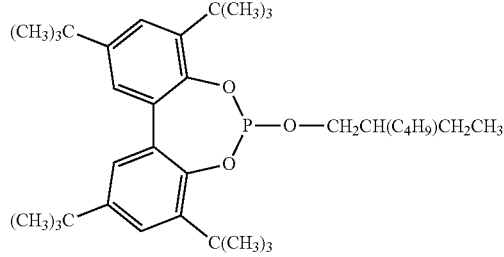
(C)

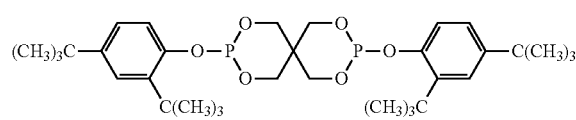
(D)

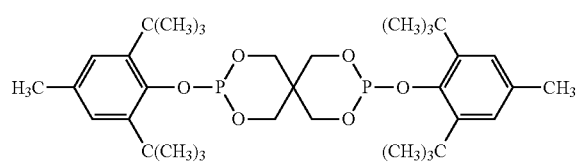
(E)

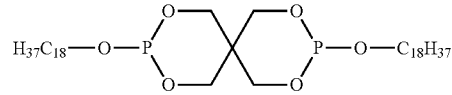
(F)

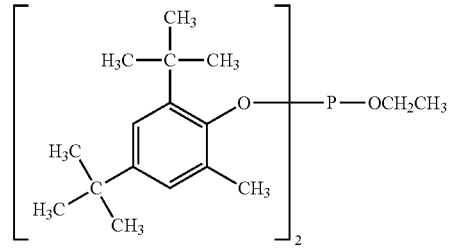
(G)

5. Hydroxylamines, for example N,N-dibenzylhydroxylamine, N,N-diethylhydroxylamine, N,N-dioctylhydroxylamine, N,N-dilaurylhydroxylamine, N,N-ditetradecylhydroxylamine, N,N-dihexadecylhydroxylamine, N,N-dioctadecylhydroxylamine, N-hexadecyl-N-octadecylhydroxylamine, N-heptadecyl-N-octadecylhydroxylamine, N,N-dialkylhydroxylamine derived from hydrogenated tallow amine.
6. Nitrones, for example, N-benzyl-alpha-phenylnitrone, N-ethyl-alpha-methylnitrone, N-octyl-alpha-heptylnitrone, N-lauryl-alpha-undecylnitrone, N-tetradecyl-alpha-tridecylnnitrone, N-hexadecyl-alpha-pentadecylnitrone, N-octadecyl-alpha-heptadecylnitrone, N-hexadecyl-alpha-heptadecylnitrone, N-ocatadecyl-alpha-pentadecylnitrone, N-heptadecyl-alpha-heptadecylnitrone, N-octadecyl-alpha-hexadecylnitrone, nitrone derived from N,N-dialkylhydroxyl-amine derived from hydrogenated tallow amine.
7. Thiosynergists, for example dilauryl thiodipropionate, dimistryl thiodipropionate, distearyl thiodipropionate or distearyl disulfide.
8. Peroxide scavengers, for example esters of β-thiodipropionic acid, for example the lauryl, stearyl, myristyl or tridecyl esters, mercaptobenzimidazole or the zinc salt of 2-mercaptobenzimidazole, zinc dibutyldithiocarbamate, dioctadecyl disulfide, pentaerythritol tetrakis(β-dodecylmercapto)propionate.
9. Polyamide stabilizers, for example copper salts in combination with iodides and/or phosphorus compounds and salts of divalent manganese.
10. Basic co-stabilizers, for example melamine, polyvinylpyrrolidone, dicyandiamide, triallyl cyanurate, urea derivatives, hydrazine derivatives, amines, polyamides, polyurethanes, alkali metal salts and alkaline earth metal salts of higher fatty acids, for example calcium stearate, zinc stearate, magnesium behenate, magnesium stearate, sodium ricinoleate and potassium palmitate, antimony pyrocatecholate or zinc pyrocatecholate.
11. Nucleating agents, for example inorganic substances, such as talcum, metal oxides, such as titanium dioxide or magnesium oxide, phosphates, carbonates or sulfates of, preferably, alkaline earth metals; organic compounds, such as mono- or polycarboxylic acids and the salts thereof, e.g. 4-tert-butylbenzoic acid, adipic acid, diphenylacetic acid, sodium succinate or sodium benzoate; polymeric compounds, such as ionic copolymers (ionomers). Especially preferred are 1,3:2,4-bis(3',4'-dimethylbenzylidene)sorbitol, 1,3:2,4-di(paramethyldibenzylidene)sorbitol, and 1,3:2,4-di(benzylidene)sorbitol.
12. Fillers and reinforcing agents, for example calcium carbonate, silicates, glass fibres, glass beads, asbestos, talc, kaolin, mica, barium sulfate, metal oxides and hydroxides, carbon black, graphite, wood flour and flours or fibers of other natural products, synthetic fibers.
13. Other additives, for example plasticisers, lubricants, emulsifiers, pigments, rheology additives, catalysts, flow-control agents, flameproofing agents, antistatic agents and blowing agents.
14. Benzofuranones and indolinones, for example those disclosed in U.S. Pat. No. 4,325,863; U.S. Pat. No. 4,338,244; U.S. Pat. No. 5,175,312; U.S. Pat. No. 5,216,052; U.S. Pat. No. 5,252,643; DE-A-4316611; DE-A-4316622; DE-A-4316876; EP-A-0589839, EP-A-0591102; EP-A-1291384 or 3-[4-(2-acetoxyethoxy) phenyl]-5,7-di-tert-butylbenzofuran-2-one, 5,7-di-tert-butyl-3-[4-(2-stearoyloxyethoxy)phenyl]benzofuran-2-one, 3,3'-bis[5,7-di-tert-butyl-3-(4-[2-hydroxyethoxy] phenyl)benzofuran-2-one], 5,7-di-tert-butyl-3-(4-ethoxyphenyl)benzofuran-2-one, 3-(4-acetoxy-3,5-dimethylphenyl)-5,7-di-tert-butylbenzofuran-2-one, 3-(3, 5-dimethyl-4-pivaloyloxyphenyl)-5,7-di-tert-butylbenzofuran-2-one, 3-(3,4-dimethylphenyl)-5,7-di-tert-butylbenzofuran-2-one, 3-(2,3-dimethylphenyl)-5,7-di-tert-butylbenzofuran-2-one, 3-(2-acetyl-5-isooctylphenyl)-5-isooctylbenzofuran-2-one.

In general, the conventional additive may be present in a layer in an amount of, for example, 0.001 to 20 weight-% or 0.01 to 20 weight-%, preferably 0.001 to 5 weight-% or 0.01 to 5 weight-%, relative to the weight of the corresponding layer.

The multi-layered films according to the present invention are preferably composed of only four layers, whereby protective layer (A) is the first layer, barrier layer (B) is the second layer, base layer (C) is the third layers and adhesive layer (D) is the fourth layer.

The multi-layered film according to the present invention is preferably characterized in that it has a degree of elongation of 200 to 1000%.

The multi-layered films according to the present invention can be adhered to metal or plastic surfaces by known techniques. It is preferred to attach the multi-layered film with the side of the adhesive layer (D) to the metal or plastic substrate and then to heat the film to an elevated temperature, like 40 to 100° C. in order to improve softness and elongation of the film. This can, for example, be affected by heating with hot air.

According to a preferred embodiment the multi-layered films are used for the application to a metal or plastic surface of transportation means, packagings, apparatuses, construction parts and electric and electronic devices, especially such surfaces of an automobile. It is preferred that the surfaces, especially those of the automobiles, are not lacquered, meaning that the multi-layered films are used instead of the lacquer. In order to prevent corrosion, metal surfaces may beforehand be protected by priming, like electrocoating.

Examples of plastic surfaces are epoxy, polyamide, polyurethane and polycarbonate.

As surfaces metal, like steel, is preferred.

Accordingly, a more preferred embodiment of the present invention is directed to the use of a multi-layered film for the application to the surface of an automobile, wherein the film comprises a protective layer (A) as a first layer, which is a poly(alkyl methacrylate) film comprising at least one hindered amine light stabilizer and at least one ortho-hydroxy tris-aryl triazine UV absorber,
a barrier layer (B),
a base layer (C),
an adhesive layer (D) as last layer, and wherein
barrier layer (B) and/or base layer (C) comprise at least one pigment.

As to layers (A) to (D) and the film the meanings and preferences given before shall apply.

As to this embodiment it is preferred that the protective layer (A) comprises as ortho-hydroxy tris-aryl triazine UV absorber at least one compound of formulae (7) and (8), preferably two different ortho-hydroxy tris-aryl triazine UV absorber selected from compounds of formulae (7) and (8), and more preferably at least one ortho-hydroxy tris-aryl triazine UV absorber of formula (7) and at least one ortho-hydroxy tris-aryl triazine UV absorber of formula (8).

It is also preferred that the surfaces of the automobiles, are not lacquered, meaning that the multi-layered films are used instead of the lacquer.

The multi-layered films according to the present invention have high weatherability, high heat resistance, high light stability, high chemical resistance, high solvent resistance, high water resistance and high abrasion resistance. Furthermore, the films have a good flexibility and it is possible to pigment such films without impairing the other desirable properties of the films. If handled appropriately, the multi-layered film can be applied without blisters. It can be heated with hot air, to assist shaping. After having cooled, the film retains its shape even on extremely highly domed or recessed portions and at convex edges.

By using the film, it is possible to save the investment otherwise required for an expensive lacquer treatment in the car factory. In addition, later processes like color coating, clear coating and respective drying processes can be eliminated.

Furthermore, the multi-layered films can also be applied to carbon fiber reinforced plastics. Usually thermosetting resins like epoxy are used, because of their high glass-transition temperature. High glass-transition temperature resins cannot be thermal deformed during drying processes of painting processes. However, the multi-layered films do not need drying process. This means that carbon fiber reinforced plastic producers can use thermoplastic resins for carbon fiber reinforced plastics. This provides carbon fiber reinforced plastics producers with more flexibility, i.e. to adopt injection moulding and reaction injection moulding by using relatively low glass-transition temperature resins (like Tg=80-350° C.), like general purpose plastics like ABS, polypropylene, polyurethane, engineering plastics like polyamide, polyester and super engineering plastics like PPS.

Furthermore, the multi-layered films can be applied to other filler reinforced plastics, e.g. glass fiber, nano carbons etc.

The multi-layered films can also be used for only separate parts of the automotive body, like only for car wings. It is in principle also possible to cover the whole automotive body not only by one multi-layered film, but to use several multi-layered films (which each cover a distinct part of the automotive body).

The multi-layered film can give plastics more feasibility to be applied to automotive parts. As a result, the film can make automotive bodies be lighter and have lower energy consumption and higher design flexibility.

The following Examples illustrates the invention:

EXAMPLE 1

A composite film is prepared comprising the following layers in the stated order:
a protective layer (A)
a barrier layer (B)
a base layer (C), and
an adhesive layer (D)

Protective layer (A): The protective layer (A) is prepared by dry-blending of a poly(methyl methacrylate) resin (rubber copolymerized PMMA, Acrypet IRG304 001 available from Mitsubishi Rayon) with 1% TINUVIN® 1577+1% TINUVIN® 460+0.1% TINUVIN® NOR 371. The blend is placed into an extruder hopper and then extruded at a temperature of 280° C. using conventional methods to obtain a film having a thickness of 50 microns.

Barrier layer (B): The barrier layer (B) is prepared by dry-blending of a polyvinylidene chloride resin (available as Ixan® PVS 815 from Solvay S.A.) with 6% of the pigment DAP-4050 White and 6% of the pigment DAP-4443 Yellow (both available from Dainichiseika Color & Chemicals Mfg. Co., Ltd.) and then extruded using conventional methods to obtain a film having a thickness of 50 microns.

Base layer (C): The base layer (C) is a thermoplastic polyurethane film having 150 micron thickness (available as NY585 white thermo polyurethane film from Sheedom Co., Ltd.) with 10% of the pigment Dymic SZ 7030 white (available from Dainichiseika Color & Chemicals Mfg. Co., Ltd.).

Adhesive layer (D): The adhesive layer (D) is composed of a polyurethane adhesive as described for adhesive layer D) in Example 1 on page 26 of WO-A-2012/065966.

The composite film is prepared by laminating the protective layer (A) with the barrier layer (B), and then laminating on the barrier layer (B) the base layer (C). Lamination is carried out by use of adhesives according to conventional processes, like dry and wet lamination. The outer part of base layer (C) is then coated with the adhesive to form layer (D) having a thickness of 10-15 microns.

TINUVIN® 1577 is the compound of formula (7-C).
TINUVIN® 460 is the compound of formula (8-B).
TINUVIN® NOR 371 is the compound of formula (3-B), wherein $R_6$ is —$OC_3H_7$.

The resulting composite film is tested according to DIN EN ISO 527 by use of the measuring machine Toyo Boldwin (Tensilon, UTM-III-200), and the following measuring conditions:
Sample size: rectangular specimen, width 10 mm×length 70 mm
Inter-chuck distance: 40 mm
Testing speed: 100 mm/minute
Testing temperature: 20° C.

The following properties are obtained for the composite film of this Example 1:
Young's modulus: 1014 megapascal
Tensile strength at break: 44.9 megapascal
Elongation at break: 626% gauge length

EXAMPLE 2

A composite film is prepared comprising the following layers in the stated order:
a protective layer (A)
a barrier layer (B)
a base layer (C), and
an adhesive layer (D)

Protective layer (A): The protective layer (A) is prepared by dry-blending of a poly(methyl methacrylate) resin (rubber copolymerized PMMA, Acrypet IRG304 001 available from Mitsubishi Rayon) with 1% TINUVIN® 1577+1% TINUVIN® 460+0.1% TINUVIN® NOR 371. The blend is placed into an extruder hopper and then extruded at a temperature of 280° C. using conventional methods to obtain a film having a thickness of 50 microns.

Barrier layer (B): The barrier layer (B) is prepared by dry-blending of polypropylene with 0.1% CHIMASSORB® 2020 and 3.7% of the pigment HCM SMB 429 Yellow (available from Dainichiseika Color & Chemicals Mfg. Co., Ltd.) and then extruded using conventional methods to obtain a film having a thickness of 100 microns.

Base layer (C): The base layer (C) is a thermoplastic polyurethane film comprising 0.1% CHIMASSORB® 2020 and having 100 micron thickness, which is obtained according to conventional methods by dry-blending of thermoplastic polyurethane (available as NY585 white thermo polyurethane film from Sheedom Co., Ltd.) and extrusion with 10% of the pigment Dymic SZ 7030 white (available from Dainichiseika Color & Chemicals Mfg. Co., Ltd.).

Adhesive layer (D): The adhesive layer (D) is composed of a polyurethane adhesive as described for adhesive layer D) in Example 1 on page 26 of WO-A-2012/065966.

The composite film is prepared by laminating the protective layer (A) with the barrier layer (B), and then laminating on the barrier layer (B) the base layer (C). Lamination is carried out by use of adhesives according to conventional processes, like dry and wet lamination. The outer part of base layer (C) is then coated with the adhesive to form layer (D) having a thickness of 10-15 microns.

The resulting composite film is tested according to DIN EN ISO 527 by use of the measuring machine Toyo Boldwin (Tensilon, UTM-III-200), and the following measuring conditions:
Sample size: rectangular specimen, width 10 mm×length 70 mm Inter-chuck distance: 40 mm
Testing speed: 100 mm/minute
Testing temperature: 20° C.

The following properties are obtained for the composite film of this Example 2:
Young's modulus: 622 megapascal
Tensile strength at break: 36.1 megapascal
Elongation at break: 684% gauge length

EXAMPLE 3

Application of the Composite Film of Example 1 to a Car Body

The car body is composed of steel and first coated by electrodeposition coating with an epoxy resin in order to prevent corrosion. Then the composite film of Example 1 is attached with the side of the adhesive layer (D) to the car body. The temperature of the film is increased to 50° C. and the film becomes soft and has higher elongation. The film enwraps the surface of the steel. The temperature of the film is then increased to 80-100° C. and the adhesive layer is completely melted, reacted, cured and adhered.

The invention claimed is:

1. A multi-layered film for application to a metal or plastic surface, the multi-layered film comprising:
    (A) a protective layer (A) as a first layer;
    (B) a barrier layer (B);
    (C) a base layer (C); and
    (D) an adhesive layer (D) as a last layer,
wherein:
    the protective layer (A) is a poly(alkyl methacrylate) film comprising at least one hindered amine light stabilizer and at least two different ortho-hydroxy tris-aryl triazine UV absorbers selected from the group consisting of a compound of formula (7) and a compound of formula (8):

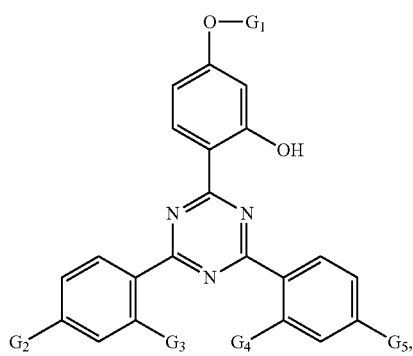

(7)

wherein
    $G_1$ is hydrogen, $C_1$-$C_{18}$alkyl, $C_1$-$C_{18}$alky substituted by 1, 2 or 3 radicals selected from the group consisting of —OH, $C_2$-$C_{18}$ alkenyloxy, —C(O)OL$_1$ and —OC(O)L$_2$,
    $L_1$ and $L_2$ being independently $C_1$-$C_{18}$alkyl, $C_3$-$C_{50}$alkyl interrupted by oxygen or $C_3$-$C_{50}$hydroxyalkyl interrupted by oxygen,
    $G_2$, $G_3$, $G_4$ and $G_5$ are independently hydrogen, $C_1$-$C_{18}$alkyl, phenyl or phenyl substituted by 1, 2 or 3 $C_1$-$C_4$alkyl;

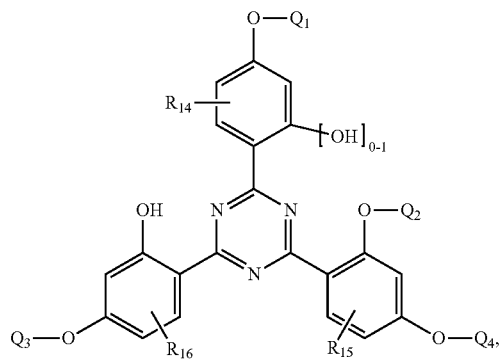

(8)

wherein
    $Q_1$, $Q_2$, $Q_3$ and $Q_4$ are independently hydrogen, $C_1$-$C_{18}$alkyl, $C_1$-$C_{18}$alkyl substituted by 1, 2 or 3 radicals selected from the group consisting of —OH, $C_2$-$C_{18}$alkenyloxy, —C(O)OY$_1$ and —OC(O)Y$_2$ with Y$_1$ and Y$_2$ being independently $C_1$-$C_{18}$alkyl; $C_3$-$C_{50}$alkyl interrupted by oxygen or $C_3$-$C_{50}$hydroxyalkyl interrupted by oxygen, and
    $R_{14}$, $R_{15}$ and $R_{16}$ are independently from each other hydrogen or $C_1$-$C_{18}$alkyl; and
the barrier layer (B), the base layer (C), or both, comprise at least one pigment.

2. The multi-layered film according to claim 1, wherein the barrier layer (B), the base layer (C), or both, comprise at least one hindered amine light stabilizer.

3. The multi-layered film according to claim 1 wherein the hindered amine light stabilizer is a compound of formula (1):

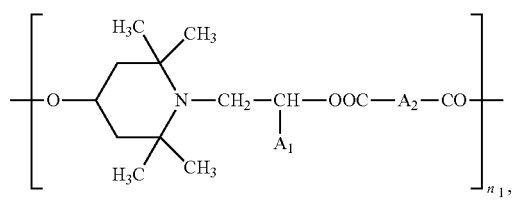

(1)

wherein
    $A_1$ is hydrogen or $C_1$-$C_4$alkyl,
    $A_2$ is a direct bond or $C_1$-$C_{10}$alkylene, and
    $n_1$ is a number from 2 to 50;
or a compound of the formula (2):

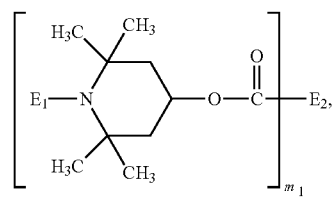

(2)

wherein
    $E_1$ is hydrogen, $C_1$-$C_8$alkyl, O, —OH, —CH$_2$CN, $C_1$-$C_{18}$alkoxy, hydroxyl-substituted $C_1$-$C_{18}$alkoxy, $C_5$-$C_{12}$cycloalkoxy, $C_3$-$C_6$alkenyl, $C_7$-$C_9$phenylalkyl unsubstituted or substituted on the phenyl by 1, 2 or 3 $C_1$-$C_4$alkyl; or $C_1$-$C_8$acyl, $m_1$ is 1, 2 or 4, if $m_1$ is 1, $E_2$ is $C_1$-$C_{25}$alkyl, a group of the formula —C(CH$_3$)=CH$_2$, or a group of the formula (2a):

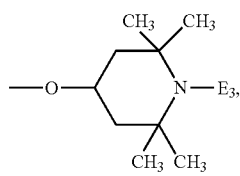

(2a)

$E_3$ is as defined for $E_1$, if $m_1$ is 2, $E_2$ is $C_1$-$C_{14}$alkylene or a group of the formula (2b):

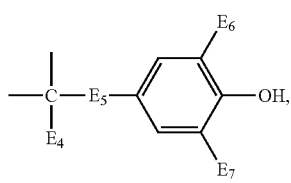

(2b)

wherein $E_4$ is $C_1$-$C_{10}$alkyl or $C_2$-$C_{10}$alkenyl, $E_5$ is $C_1$-$C_{10}$alkylene, and $E_6$ and $E_7$ independently of one another are $C_1$-$C_4$alkyl, cyclohexyl or methylcyclohexyl, and if $m_1$ is 4, $E_2$ is $C_4$-$C_{10}$alkanetetrayl;

or a compound of the formula (3):

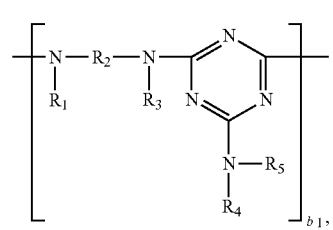

(3)

wherein $R_1$, $R_3$, $R_4$ and $R_5$ independently of one another are hydrogen, $C_1$-$C_{12}$alkyl, $C_5$-$C_{12}$cycloalkyl, $C_1$-$C_4$-alkyl-substituted $C_5$-$C_{12}$cycloalkyl, phenyl, phenyl which is substituted by —OH and/or $C_1$-$C_{10}$alkyl; $C_7$-$C_9$phenylalkyl, $C_7$-$C_9$phenylalkyl which is substituted on the phenyl radical by —OH and/or $C_1$-$C_{10}$alkyl; or a group of the formula (3a)

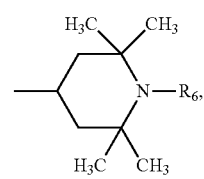

(3a)

$R_2$ is $C_2$-$C_{18}$alkylene, $C_5$-$C_7$cycloalkylene or $C_1$-$C_4$alkylenedi($C_5$-$C_7$cycloalkylene), or the radicals $R_1$, $R_2$ and $R_3$, together with the nitrogen atoms to which they are bonded, form a 5- to 10-membered heterocyclic ring, or $R_4$ and $R_5$, together with the nitrogen atom to which they are bonded, form a 5- to 10-membered heterocyclic ring, $R_6$ is hydrogen, $C_1$-$C_8$alkyl, O, —OH, —CH$_2$CN, $C_1$-$C_{18}$alkoxy, $C_5$-$C_{12}$cycloalkoxy, $C_3$-$C_6$alkenyl, $C_7$-$C_9$phenylalkyl unsubstituted or substituted on the phenyl by 1, 2 or 3 $C_1$-$C_4$alkyl; or $C_1$-$C_8$acyl, and $b_1$ is a number from 2 to 50, with the proviso that at least one of the radicals $R_1$, $R_3$, $R_4$ and $R_5$ is a group of the formula (3a);

or a compound of the formula (4), (5) or (6):

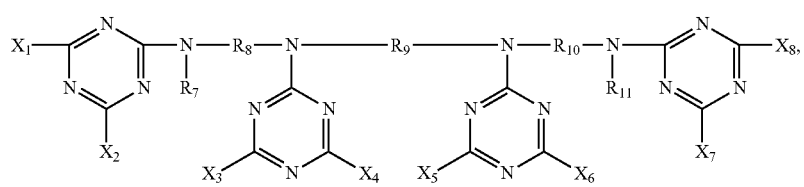

(4)

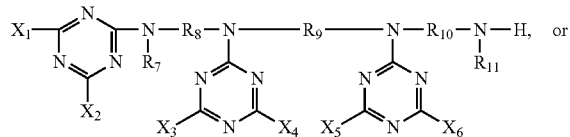

(5)

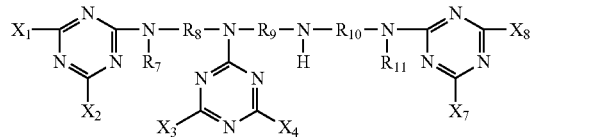

(6)

wherein $R_7$ and $R_{11}$ independently of one another are hydrogen or $C_1$-$C_{12}$alkyl, $R_8$, $R_9$ and $R_{10}$ independently of one another are $C_2$-$C_{10}$alkylene, and $X_1$, $X_2$, $X_3$, $X_4$, $X_5$, $X_6$, $X_7$ and $X_8$ independently of one another are a group of the formula (4a):

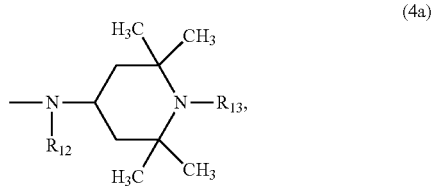

(4a)

$R_{12}$ is hydrogen, $C_1$-$C_{12}$alkyl, $C_5$-$C_{12}$cycloalkyl, $C_1$-$C_4$alkyl-substituted $C_5$-$C_{12}$cycloalkyl, phenyl, —OH— and/or $C_1$-$C_{10}$alkyl-substituted phenyl, $C_7$-$C_9$phenylalkyl, $C_7$-$C_9$phenylalkyl which is substituted on the phenyl radical by —OH and/or $C_1$-$C_{10}$alkyl; or a group of the formula (3a) as defined above, and $R_{13}$ is hydrogen, $C_1$-$C_8$alkyl, O, —OH, —CH$_2$CN, $C_1$-$C_{18}$alkoxy, $C_5$-$C_{12}$cycloalkoxy, $C_3$-$C_6$alkenyl, $C_7$-$C_9$phenylalkyl unsubstituted or substituted on the phenyl by 1, 2 or 3 $C_1$-$C_4$alkyl; or $C_1$-$C_8$acyl.

4. The multi-layered film according to claim 3, wherein the hindered amine light stabilizer is the compound of formula (3).

5. The multi-layered film according to claim 1, wherein the protective layer (A) comprises at least one ortho-hydroxyl tris-aryl triazine UV absorber of formula (7) and at least one ortho-hydroxy tris-aryl triazine UV absorber of formula (8).

6. The multi-layered film according to claim 1, wherein the protective layer (A) further comprises a diene-based polymer.

7. The multi-layered film according to claim 1, wherein the barrier layer (B) is a polyvinylidene chloride film, a cyclo olefin copolymer film, a polyethylenenaphthalate film, a polyethylene film or a polypropylene film.

8. The multi-layered film according to claim 1, wherein the barrier layer (B) is a polyethylene film or a polypropylene film.

9. The multi-layered film according to claim 1, wherein the base layer (C) is a thermoplastic polyurethane film.

10. The multi-layered film according to claim 1, wherein the adhesive layer (D) is a coating based on a polyurethane.

11. The multi-layered film according to claim 1, wherein the barrier layer (B), the base layer (C), or both, comprises at least one plasticizer.

12. The multi-layered film according to claim 1, wherein the multi-layered film is attached to a metal or plastic surface of a transportation device, a package, an apparatus, a construction part, an electric device or an electronic device.

13. The multi-layered film according to claim 1, wherein the multi-layered film is attached to a surface of an automobile.

14. A method, comprising attaching the multi-layered film of claim 1 to a surface of an automobile.

15. The method according to claim 14, wherein the surface of the automobile is not lacquered.

* * * * *